United States Patent [19]

Petersen

[11] Patent Number: 5,679,258

[45] Date of Patent: Oct. 21, 1997

[54] MIXED IMMISCIBLE LIQUIDS COLLECTION, SEPARATION, AND DISPOSAL METHOD AND SYSTEM

[76] Inventor: Robert N. Petersen, 2300 39th St., Bellingham, Wash. 98226

[21] Appl. No.: 500,255

[22] Filed: Jul. 10, 1995

[51] Int. Cl.$^6$ .................... B01D 17/035; B01D 21/34
[52] U.S. Cl. .................... 210/703; 210/86; 210/104; 210/109; 210/259; 210/521; 210/804; 210/808
[58] Field of Search ................ 210/86, 87, 90, 210/96.1, 103, 104, 109, 110, 114, 115, 117, 120, 121, 123, 127, 134, 136, 137, 143, 170, 207, 218, 259, 519, 521, 538, 539, 540, 703, 747, 804, 806, DIG. 5, 406, 532.1, 533, 537, 295, 299; 137/215–217

[56] References Cited

U.S. PATENT DOCUMENTS

| | | | |
|---|---|---|---|
| 4,492,630 | 1/1985 | Rymal | 210/117 |
| 4,623,452 | 11/1986 | Petersen | 210/104 |
| 4,960,513 | 10/1990 | Young | 210/104 |
| 5,133,882 | 7/1992 | Stearns | 210/703 |
| 5,202,031 | 4/1993 | Rymal | 210/703 |
| 5,464,529 | 11/1995 | Kozak | 210/104 |
| 5,484,522 | 1/1996 | Entrekin | 210/114 |

*Primary Examiner*—Joseph W. Drodge

[57] ABSTRACT

A system to collect by vacuum conveyance, separate, and discharge two mixed immiscible liquids with different specific gravities comprising a grit, sediment, particulate, and floating debris removal/collection chamber 11, vacuum tank 51, optional heavy phase supplemental separation stage 47A, and optional light phase supplemental separation stage 47B. Vacuum tank 51 is under a constant regulated vacuum, which sucks mixed immiscible liquids with different specific gravities from their respective remote source(s) through conduit(s) connected to vacuum tank 51. Collection conduits can have manually, mechanically, or electro-mechanically controlled valves at their source ends. Any grit, sediment, particles, floatable debris, and entrained air in the collection conduits is removed from the mixed liquid stream prior to undergoing any phase separation stages. Initial phase separation occurs automatically in vacuum tank 51, which provides quiescent conditions for gravity separation of mixed immiscible liquids. Gravity separation is further enhanced by low grade dissolved air flotation separation which is induced by the vacuum in vacuum tank 51. Additional phase separation can occur, if necessary, in supplemental separation stage(s) 47A and/or 47B. Heavy phase supplemental separation stage 47A separates the light phase from the heavy phase, if necessary. Light phase supplemental separation stage 47B separates the heavy phase from the light phase, if necessary. Separated phases are discharged to their own individual repository or depository, such as a storage tank, a sewer, well injection, additional separation, additional treatment to remove other contaminants, and/or process reuse.

18 Claims, 5 Drawing Sheets

FLOWCHART

FLOWCHART**

5,679,258

MIXED IMMISCIBLE LIQUIDS COLLECTION, SEPARATION, AND DISPOSAL METHOD AND SYSTEM

BACKGROUND—CROSS-REFERENCES TO RELATED APPLICATIONS

N/A

BACKGROUND—FIELD OF INVENTION

This invention relates to the arts of liquid/liquid separators and vacuum transport systems, specifically to new and expanded uses for, as well as numerous significant improvements to, a previously patented Dockside System for the Collection and Disposal of Bilge Water and Waste Oil (U.S. Pat No. 4,623,452 issued to Petersen 1986 Nov. 18).

BACKGROUND—DEFINITIONS (a) The term "mixed" means two existing together.

(b) The term "immiscible" means naturally resisting, or being incapable of, blending or combining homogeneously and permanently. Immiscible liquids normally cannot be blended together whatsoever, or can be blended only slightly.

(c) The term "treated" means has already undergone some physical or chemical process or processes that has altered its original characteristics.

(d) The term "untreated" means has not yet undergone any physical or chemical process or processes intended to alter its original characteristics.

(e) The term "intermediate" means between two.

(f) The term "terminal" means the final, last, or end.

(g) The term "source" means the origination of, or the initial physical location of, untreated mixed immiscible liquids, and can comprise sumps, pits, tanks, bilges, drains, sewers, or spills into water or on land.

(h) The term "facility" means a physical point, site, location, treatment plant or system, sewer, drainage pipe, drainage field, or any container, tank, or similar storage receptacle.

(i) The term "phase" means an identifiable, partially or completely separable, component liquid in mixed immiscible liquids.

(j) The term "heavy phase" means the phase in mixed immiscible liquids with the higher specific gravity.

(k) The term "light phase" means the phase in mixed immiscible liquids with the lower specific gravity.

(l) The term "predominant phase" means the phase in mixed immiscible liquids that is greater than or equal to 50% by volume of the total volume of mixed immiscible liquids.

(m) The term "subdominant phase" means the phase in mixed immiscible liquids that is less than 50% by volume of the total volume of mixed immiscible liquids.

(n) The term "conduit" means a pipe, tube, hose, or other similar device to transport liquids or gases.

(o) The term "vacuum tank" means a sealed vessel, chamber, reservoir, or container capable of sustaining within itself a vacuum without structural collapse or leakage.

(p) The term "water" can mean distilled water, fresh water, lake water, stream water, river water, creek water, ground water, waste water, and/or sea water.

(q) The term "entrained" means drawn or carried along with.

(r) The term "entrained air" means any quantity of atmospheric air that enters into a liquid conveyance conduit, said conduit being under internal vacuum, said air conveying with, before, or behind, any liquids present in the vacuum conduit towards the vacuum-generating source, but not mixing with, nor dissolving into, any liquids present, but remaining distinguishably separate from the liquids present. Entrained air is undesirable and extraneous to, but is frequently unavoidable in, actual use of a Mixed Immiscible Liquids Collection, Separation, and Disposal System.

(s) The term "vacuum" means pressure less than ambient atmospheric pressure.

BACKGROUND—DISCUSSION OF PRIOR ART

U.S. Pat. No. 4,623,452 to Petersen dated 1986 Nov. 18 describes a dockside system for the collection and disposal of bilge water and waste oil. In actuality, however, this system has practical and useful applications ranging far beyond this somewhat limited scope. Besides its stated ability to collect and dispose bilge water and waste oil, it can also collect and discharge water contaminated by lubricating and fuel oils at automotive service centers, airports, factories, refineries, construction sites, and leaking underground oil tank storage sites, to name but a few. It can also be used to intercept and treat the oily waste water flow in the kitchens and food preparation areas of restaurants in places where discharging water with more than 10 ppm cooling oil into their sewers is an illegal and fineable offense, such as in the City of Shanghai in the Peoples Republic of China. Moreover, and notwithstanding some of the classical oily water collection and disposal applications mentioned above, the system, in actuality, also has practical applications in many situations where mixed immiscible liquids with different specific gravities require collection, separation into their respective phases, and then discharge to their respective terminal facilities.

In addition, U.S. Pat. No. 4,623,452 to Petersen dated 1986 Nov. 18 suffers from a number of problems and disadvantages, specifically:

(1) It does not address, nor accommodate, the probable introduction of grit, sediment, particulates, and/or floatable debris into the system, which is frequently present in many bilge water waste streams, as well as many other commercial and industrial waste streams. Over time, grit and sediment deposits could accumulate at the bottom of the vacuum tank to such an extent that it would interfere with the proper operation of the oil water (light phase/heavy phase) interface detector and lower liquid level sensor. In addition, floating debris inside the vacuum tank could interfere with the proper operation of the upper and lower liquid level sensors. Both situations could in turn cause serious system malfunction and possible unintentional, but nonetheless harmful and/or illegal, discharge of oil, or oily water with an excessive oil concentration, into the environment. Also, grit and sediment could enter the water (heavy phase) pump inlet piping and prematurely foul the prefilter element, necessitating prefilter replacement more frequently than routine operations would otherwise predict, which could be a costly proposition for the system owner, and could inopportunely interrupt system operation. Finally, grit and sediment could be ingested into the water (heavy phase) pump, which is not inherently deleterious if a progressive cavity pump is installed as suggested as a preferred embodiment of Petersen's Patent, but it could nonetheless damage the mechanical seals on the water (heavy phase) pump pressure relief valve, or else could cause it to fail to close completely, which would cause the water (heavy phase) pump to recirculate excessive quantities of liquid to its suction port, thereby reducing the pump's discharge flow to the coalescer (terminal heavy phase treatment stage), which would ultimately, if the system was continuously collecting oily water (mixed immiscible liquids), reduce overall throughput of the system, possibly even stalling it to zero altogether.

(2) It does not prevent the disturbance or agitation of the floating oil (light phase) layer inside the vacuum tank during oily water (mixed immiscible liquids) collection. An oil (light phase) layer always exists in the vacuum tank at some thickness. The perforated vertical pipe, while adequately performing its stated purpose of preventing back-siphonage of liquid from the vacuum tank into the evacuator piping, and while allowing any entrained air in the pipe to escape through the perforations which will prevent "bubbling" of the tank contents, nonthelesss routinely forces water (heavy phase) through the standing oil (light phase) layer, which, over time, will seriously emulsify the oil layer, raising its specific gravity and viscosity until the oil becomes syrupy, almost glue-like. In this condition, the oil layer interferes with the proper operation of both the lower and upper liquid level sensors, and coats the interface detector, also rendering it useless. Any of these situations can cause serious system malfunction and, consequently, inadvertent oil discharge in harmful and/or illegal quantities into the environment, or possibly filling the waste oil (light phase) receptacle(s) with water (heavy phase) instead of waste oil (light phase).

(3) It does not prevent the separated water (heavy phase) in the vacuum tank lying directly below the horizontal oil/water (light phase/heavy phase) interface from escaping with the oil (light phase) above it through the oil (light phase) suction piping when the oil (light phase) pump runs. Thus, the waste oil (light phase) discharge stream can contain water (heavy phase), which will prematurely fill the waste oil (light phase) storage receptacles to capacity, requiring increased removal frequency, which can further lead to higher removal and disposal, or reprocessing and reclamation costs, or can preclude the intended use of the waste oil as an augmentation fuel in an industrial boiler.

(4) It does not ensure proper system functioning when oily water (mixed immiscible liquids), or worse, raw waste oil (light phase), is introduced into the vacuum tank coincident with the water (heavy phase) pump running when the free surface liquid level has descended to an elevation just above the lower liquid level sensor. In this instance, free oil and dispersed oil does not have sufficient time to rise and join the oil layer floating on the surface. Because of this insufficient detention time, the water (heavy phase) pump can draw raw waste oil (light phase) into its suction pipe, and discharge it into the next water (heavy phase) separation stage (which could be a coalescer filter or ultrafiltration membrane) which can either overload it, foul it, or disarm it, which in turn can cause a possible escape of oil into the clean water discharge, which would result in an excessive concentration of oil in the discharge water, which is illegal, or it can cause premature system shutdown and the need to perform maintenance to restore proper operations. If an ultrafiltration membrane is used, oil discharge to the environment is not likely in this event, however, premature membrane fouling is likely.

(5) It incorporates a mechanical float valve connected to the vacuum pump inlet conduit to prevent liquid entry into the vacuum pump. This safety device, while effective when new, is prone to leakage over time due to valve seat corrosion and loss of seal. In addition, when the liquid level in the vacuum tank does rise and cause the mechanical float valve to dose, the vacuum pump will continue to run if operating in the manual control mode or if operating in the automatic mode and the vacuum switch senses a vacuum intensity in the vacuum tank less than its control setting, thereby wasting electrical energy. Finally, while the device itself is relatively inexpensive, physically incorporating it into the system involves cutting, welding, and tapping, with its attendant additional labor and material costs.

(6) It requires the installation of a vacuum relief valve in the vacuum pump inlet conduit in conjunction with the mechanical float valve mentioned in subparagraph (5) above to provide cooling air to the vacuum pump in case the mechanical float valve closed, which would otherwise therefore isolate the vacuum pump from its normal air source, the vacuum tank, and overheat the vacuum pump, possibly causing its failure and consequent expensive repairs. Also, it failed to define the positioning of the vacuum relief valve so that, besides providing cooling air to the vacuum pump if the mechanical float valve closed, the vacuum relief valve would also limit the maximum vacuum applied inside the vacuum tank, thereby ensuring that the water and oil pumps would continue to function as the liquid level in the vacuum tank descended, which would therefore increase the vacuum intensity in the vacuum tank, possibly reducing the net positive suction head available below the net positive suction head required by the water and oil pumps, therefore stalling flow through them, which would result in a system malfunction.

(7) It does not incorporate any device to signal an alarm or automatically stop waste oil (light phase) discharge (that is oil (light phase) pump operation) if the waste oil (light phase) storage receptacle(s) fill(s) to capacity. Nonexistence of this feature could result in overfilling the waste oil (light phase) storage receptacles, which would cause a spill, and possible illegal and/or harmful discharge to the environment.

(8) It incorporates a solenoid valve in the trickle return line. This device, while effective to seal the vacuum in the vacuum tank when the water (heavy phase) pump is off, is relatively costly, and requires additional circuitry and external wiring with its attendant fabrication, circuitry, and material costs.

(9) It allows exhaust air from the vacuum pump to discharge directly to the environment. This exhaust air can contain oil and water vapors, which can be harmful to personnel working near the location of the equipment. In addition, if the mechanical float valve mentioned in subparagraph (5) above fails, and liquid enters the vacuum pump, that liquid, probably oil, will also discharge directly to the environment, which could spray on people in the vicinity and most likely result in environmental pollution, a clean up mess, and a reportable accidental spill.

(10) It employs an interface probe to perform the oil water (light phase/heavy phase) interface sensing function necessary for satisfactory system operation. These devices are typically relatively expensive, involve complex, user-unfriendly electronic circuitry, consume power, don't always detect the interface, and are prone to malfunction when coated by media such as waste oil.

(11) Unlike the heavy phase component discharged from the vacuum tank, it does not address, nor accommodate, any secondary treatment or separation of the light phase component once discharged from the vacuum tank.

(12) It employs a coalescer vessel (secondary heavy phase treatment stage) drain conduit which involves a separate penetration and connection at the coalescer vessel (secondary heavy phase treatment stage) as well as a separate penetration and connection at the vacuum tank.

(13) It does not employ any device to energize an alarm device indicating that the coalescer element is fouling, which would thereby reduce total throughput, eventually declining to zero.

Finally, of all the types of oily water separators in existence today, most are of the open, gravity flow type, or of the closed, positively pressurized type. Air entrainment in the delivery piping to either of these styles is not generally considered a problem, and is easily accommodated by designing in one of many reliable and inexpensive air elimination devices readily available in the marketplace. However, some combination pressure/vacuum units exist, such as SRS Corporation's Vacuum Gravity Separator (VGS) or St Louis Ship'PACE S-Series oily water separator that employ one or many separation stages in the suction line of the internal liquid system pump. Predictably, air entrainment in the delivery piping to these units is a serious problem, and can disrupt, and even completely stop, delivery flow, with all its attendant consequences. Thus, the satisfactory operation of these units is dependent on maintaining a flooded, or full, suction pipe free of air at all times. Thus, these latter systems do not favorably lend themselves to oily water collection situations where oily water or waste oil flow is initiated and controlled manually and when air can easily enter the collection piping or hose, such as in an oil spill clean up operation.

SUMMARY OF THE INVENTION—OBJECTS AND ADVANTAGES

Accordingly, several objects and advantages of this invention are:

(1) To segregate, trap, and/or remove with minimum liquid agitation, any grit, sediment, particulates, and/or floatable debris that are entrained in the mixed immiscible liquids by providing a special grit/sediment/particulate/floating debris removal and storage device equipped with a straining/screening barrier and convenient access/clean out ports, thereby:

(a) Preventing any grit, sediment, particulates, and/or floating debris from interfering with the proper operation of the light phase/heavy phase interface detector and free surface lower and upper liquid level sensors, and (b) Preventing any grit, sediment, and/or particulates from entering the heavy phase pump suction piping, and (c) Eliminating the need for a prefilter element (and all its associated vessels, mountings, conduits, and valves) ahead of any mechanical, pressurized, or other dynamic secondary separation stage, such as a coalescer filter or ultrafiltration membrane.

(2) To prevent the disturbance or agitation of the floating light phase inside the vacuum tank during mixed immiscible liquids collection (while preserving the air elimination and anti-back-siphonage features inherent in the prior art system) by introducing all mixed immiscible liquids collected over a special horizontal weir located very near to the top, and inside of, the vacuum tank, and then down through a narrowly spaced parallel vertical baffle arrangement extending from very near the top of the vacuum tank to well below the fixed light phase/heavy phase interface detection elevation, which deposits the liquids in a laminar flow, and with minimal agitation and no air bubbles, well under any light phase floating in the vacuum tank.

(3) To exclude the heavy phase completely from the separated light phase discharge flow from the vacuum tank by adding a special horizontal deflector plate slightly below, and in combination with, a downturned pipe "L" in the light phase suction piping inside the vacuum tank. The deflector plate ensures that only the light phase is sucked into the light phase piping when the light phase pump runs by redirecting the flow influence lines horizontally at the pipe opening. The downturned pipe "L" traps the light phase in the light phase suction piping at all times, precluding the entry of the heavy phase, even when completely submerged in the heavy phase, which is a common occurrence in this system.

(4) To increase the time of detention of the two phases in the vacuum tank regardless of the free surface liquid level in the vacuum tank to permit gross fractions of the light phase to float to the surface by intentionally separating vertically the relative distances of the heavy phase discharge outlet and the light phase discharge outlet in the vacuum tank, plus by adding a downturned pipe "L" in the heavy phase suction piping, which will also contribute to maximizing the detention time of the heavy phase in the vacuum tank before entering the suction conduit connected to the heavy phase pump, given a fixed vertical separation of heavy phase and light phase discharge outlets. In addition, and to further increase opportunities for entrapment or coalescence of the light phase when the light phase is oil in water inside the vacuum tank, to advertize and permit an option at additional cost to install inside the vacuum tank oleophilic media offering a relatively high surface area when compared to its in-place volume. This media should also be non-interconnecting and offer a low packing factor (that is, low pressure drop per unit of flow distance in the direction of flow).

(5) To provide a simpler, more reliable, and less costly method to prevent liquid entry into the vacuum pump by eliminating the mechanical float valve and by using instead the already existing upper free surface liquid level sensor to simultaneously de-energize the vacuum pump and the vacuum pump control circuits at any time the sensor detects a liquid presence.

(6) To continue the use of the vacuum relief valve, but to restrict its position relative to the vacuum pump inlet conduit check valve, so that the vacuum relief valve may perform the dual functions of providing a source of cooling air to the vacuum pump in case a malfunction causes it to run without its normal source of air from the vacuum tank, and ensuring the net positive suction head required by the water pump (heavy phase) and oil pump (light phase) does not exceed the net positive suction head available.

(7) To energize remote and/or local visual and/or audible alarms and automatically stop, or to prevent, operation of the vacuum pump, heavy phase pump, or light phase pump if the light phase storage receptacle(s) fill(s) to capacity by adding a liquid level sensor in the light phase storage receptacle(s) which will de-energize the vacuum pump, heavy phase pump, and light phase pump and their respective control circuits as long as the liquid level sensor senses a liquid presence.

(8) To eliminate the solenoid valve in the trickle return line by adding a less expensive, more reliable, less complicated check valve in the heavy phase discharge piping downstream of the heavy phase intermediate treatment stage.

(9) To duct or pipe exhaust air from the vacuum pump into the vent conduit of the light phase storage receptacle(s). This duct will also serve as a conduit for any liquid which accidentally enters the vacuum pump, the liquid then filling the light phase storage receptacle(s). In conjunction with the liquid level sensing device mentioned in subparagraph (6) above, this combination will provide almost fail safe prevention against accidental light phase discharge into the environment caused by overfilling the light phase storage receptacle(s), either by the light phase pump, or by the vacuum pump.

(10) To eliminate the interface probe and provide instead a special float switch that will float in the heavy phase, but will sink in the light phase.

(11) To accommodate secondary separation of the light phase component once discharged from the vacuum tank in a similar manner as the heavy phase.

(12) To accommodate the required coalescer vessel drain conduit without additional coalescer vessel or vacuum tank penetrations and connections by branching off the existing coalescer vessel discharge conduit, and connecting it into the mixed immiscible liquids collection conduit.

(13) To incorporate a pressure differential sensing switch or flow sensing switch to energize an alarm device indicating that the flow through the coalescer element (intermediate separation stage) is less than designed.

(14) To accommodate, without adverse affect, the continuous or intermittent collection of mixed immiscible liquids of differing specific gravities in any mix, with or without entrained air, of grit, sediment, particulates, and/or floating debris, whether mechanically, electro-mechanically, or manually initiated and/or controlled, plus their separation into their respective phases, and plus their automatic discharge into their respective terminal facilities, either directly from the vacuum tank, or through an intermediate separation stage.

Further objects and advantages of this invention will become apparent from a consideration of the drawings and ensuing descriptions.

LIST OF REFERENCE NUMERALS

Figure 1:
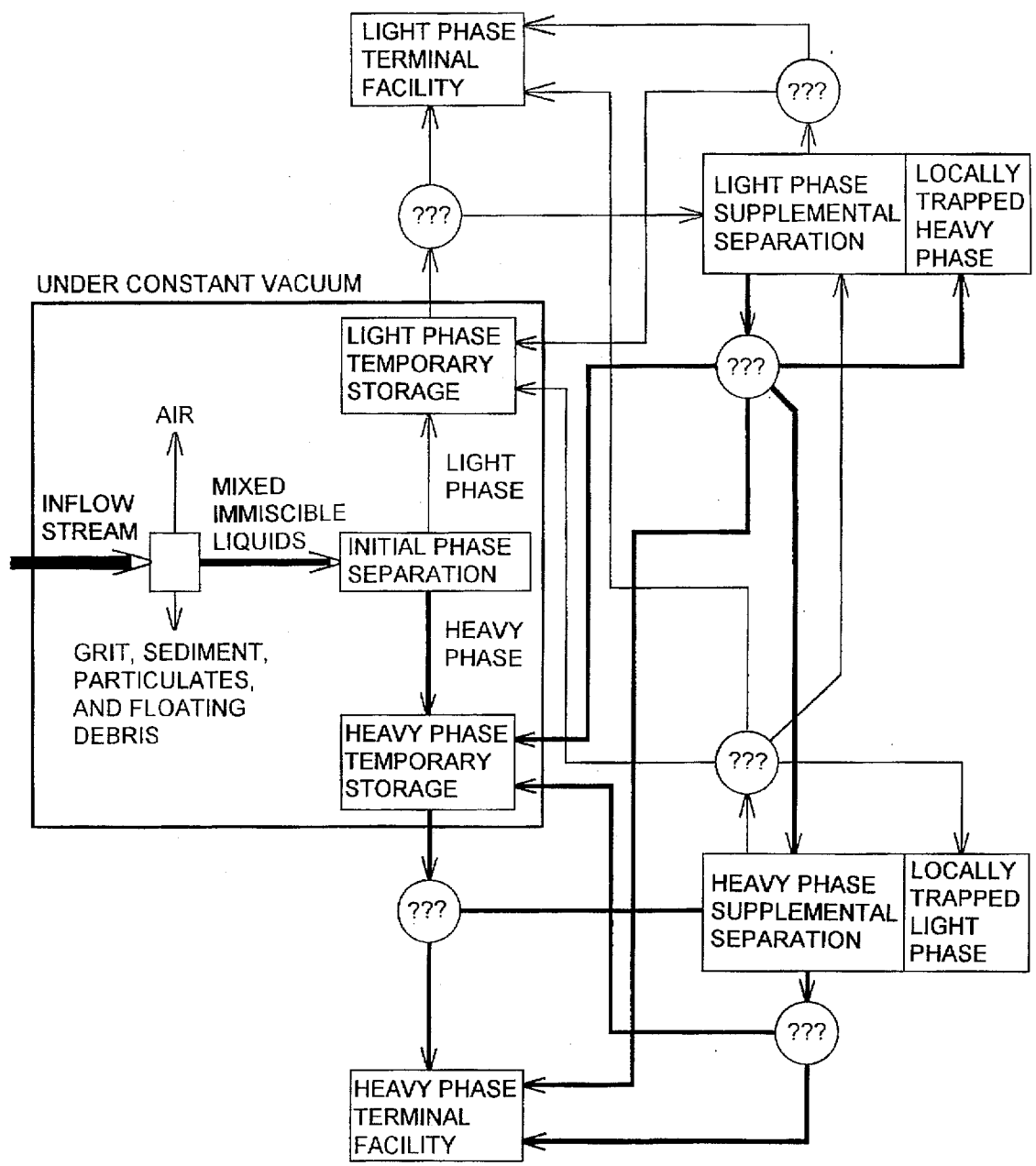
FIG. 1 outlines the basic process steps performed by the invention in flow chart form. This figure is not to scale.

10 Breaker, siphon (a & b)
11 Chamber, grit, sediment, particulate, and floating debris removal/collection
12 Cap, conduit, air, vent
13 Conduit, air, vacuum pump (a & b)
14 Conduit, air, vent (a & b)
15 Conduit, collection, mixed immiscible liquids
16 Conduit, delivery, mixed immiscible liquids
17 Conduit, discharge, heavy phase
18 Conduit, discharge, light phase
19 Conduit, partially treated heavy phase
20 Conduit, partially treated light phase
21 Conduit, return, light phase, from heavy phase intermediate separation stage
22 Conduit, return, heavy phase, from light phase intermediate separation stage
23 Conduit, drain (a & b)
24 Cover, vessel, heavy phase intermediate separation stage
25 Deflector, flow, horizontal (a & b)
26 Elbow, pipe (a & b)
27 Filter, coalescing
28 Floor, chamber, grit, sediment, particulate, and floating debris removal/collection
29 Gauge, pressure (a–c)
30 Guage, vacuum
31 Level, liquid surface control (a–d)
32 Level, phase interface control
33 Media, oleophilic
34 Panel, logic
35 Plate, perforated, air baffle
36 Plate, perforated, oleophilic media containment (a & b)
37 Plate, barrier, vertical, floating light phase
38 Pump, heavy phase
39 Pump, light phase 40 Pump, vacuum
41 Receptacle, light phase
42 Rod, guide
43 Sensor, liquid surface level (a–c)
44 Sensor, phase interface
45 Screen, barrier, chamber, grit, sediment, particulate, and floating debris
46 Shelf, interceptor, mixed immiscible liquids
47 Stage, separation, intermediate (a & b)
48 Switch, differential pressure
49 Switch, vacuum
50 System, Mixed Immiscible Liquids Vacuum, Separation, and Disposal
51 Tank, vacuum
52 Valve, check (a–e)
53 Valve, drain (a–c)
54 Valve, float, or other mechanically actuated and controlled
55 Valve, manually actuated and controlled (a–c)
56 Valve, metering
57 Valve, relief, pressure (a & b)
58 Valve, relief, vacuum
59 Valve, solenoid, motorized, or other electrically actuated and controlled
60 Vessel, heavy phase intermediate separation stage
61 Wall, chamber, grit, sediment, particulate, and floating debris removal/collection
62 Weir, overflow, horizontal

DETAILED DESCRIPTION OF THE INVENTION

Referring to FIG. 1, the basic process is shown in flowchart form. An inflow stream is treated which can contain mixed immiscible liquids, grit, sediment, particulates, floating debris, and/or air. An air removal and grit, sediment, particulate, and floating debris removal stage is first used. An initial phase separation stage follows. Temporary storage stages for partially or totally separated light and heavy phases, respectively, follow. Optional intermediate separation stages for partially separated light and heavy phases, respectively, follow. An optional stage to trap light phase at the heavy phase intermediate separation stage then follows. Likewise, an optional stage to trap heavy phase at the light phase intermediate separation stage follows. Finally, a terminal facility for each respective separated phase is used.

Figure 2:
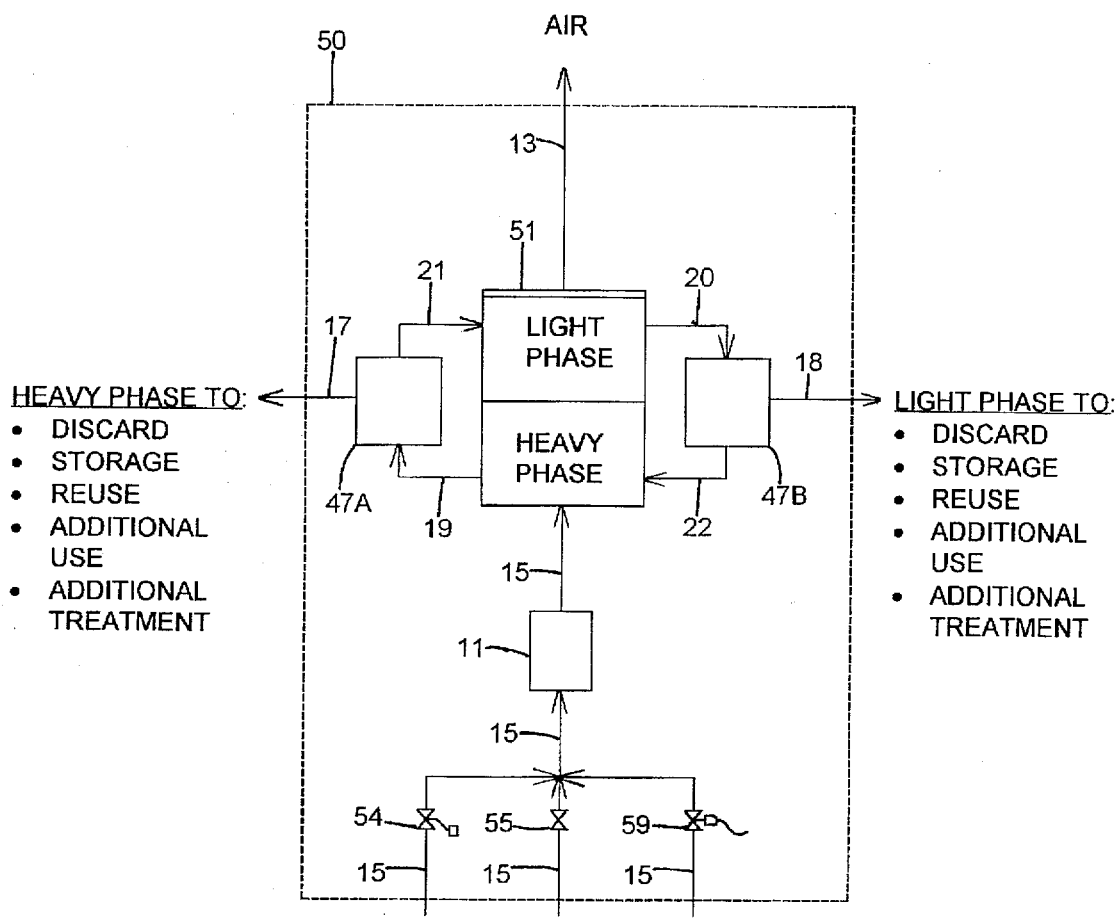
FIG. 2 shows major system components and general system flow patterns, and graphically depicts some of the many possible mixed immiscible liquids collection and separated phase discharge conduit options available. This figure is a partial schematic. This figure is not to scale.

Referring to FIG. 1 and FIG. 2, some of the main components of a Mixed Immiscible Liquids Vacuum, Separation, and Disposal System 50 are shown in an embodiment that uses the optional intermediate phase separation stages mentioned in the paragraph above, together with the optional subdominant phase return lines leading from the intermediate phase separation stages. One or many mixed immiscible liquids collection conduit(s) 15 connects to one or many mixed immiscible liquids sources through one or many, or any combination of, float, or other mechanically actuated and controlled valve(s) 54, manually actuated and controlled valve(s) 55, and/or solenoid, motorized, or other electrically actuated and controlled valve(s) 59 through a grit, sediment, particulate, and floating debris collection/removal chamber 11 and into a vacuum tank 51. As described further in the next paragraph below, grit, sediment, particulate, and floating debris collection/removal chamber 11 may be external to vacuum tank 51, or may be internal and an integral part of vacuum tank 51. If grit chamber 11 is external to vacuum tank 51, then some details regarding mixed immiscible liquids introduction into vacuum tank 51, also mentioned in the following paragraphs, will require slight modification. Vacuum tank 51 further connects to optional heavy phase and light phase intermediate separation stages 47A and 47B, respectively, via a partially treated heavy phase conduit 19 and a heavy phase intermediate separation stage light phase return conduit 21, and a partially treated light phase conduit 20 and a light phase intermediate separation stage heavy phase return conduit 22, respectively. A heavy phase discharge conduit 17 carries separated heavy phase liquid to any one or several optional terminal facilities. Likewise, a light phase discharge conduit 18 carries separated light phase liquid to any one of several optional terminal facilities. A vacuum pump exhaust air conduit 13 carries air extracted from vacuum tank 51.

Figure 3:
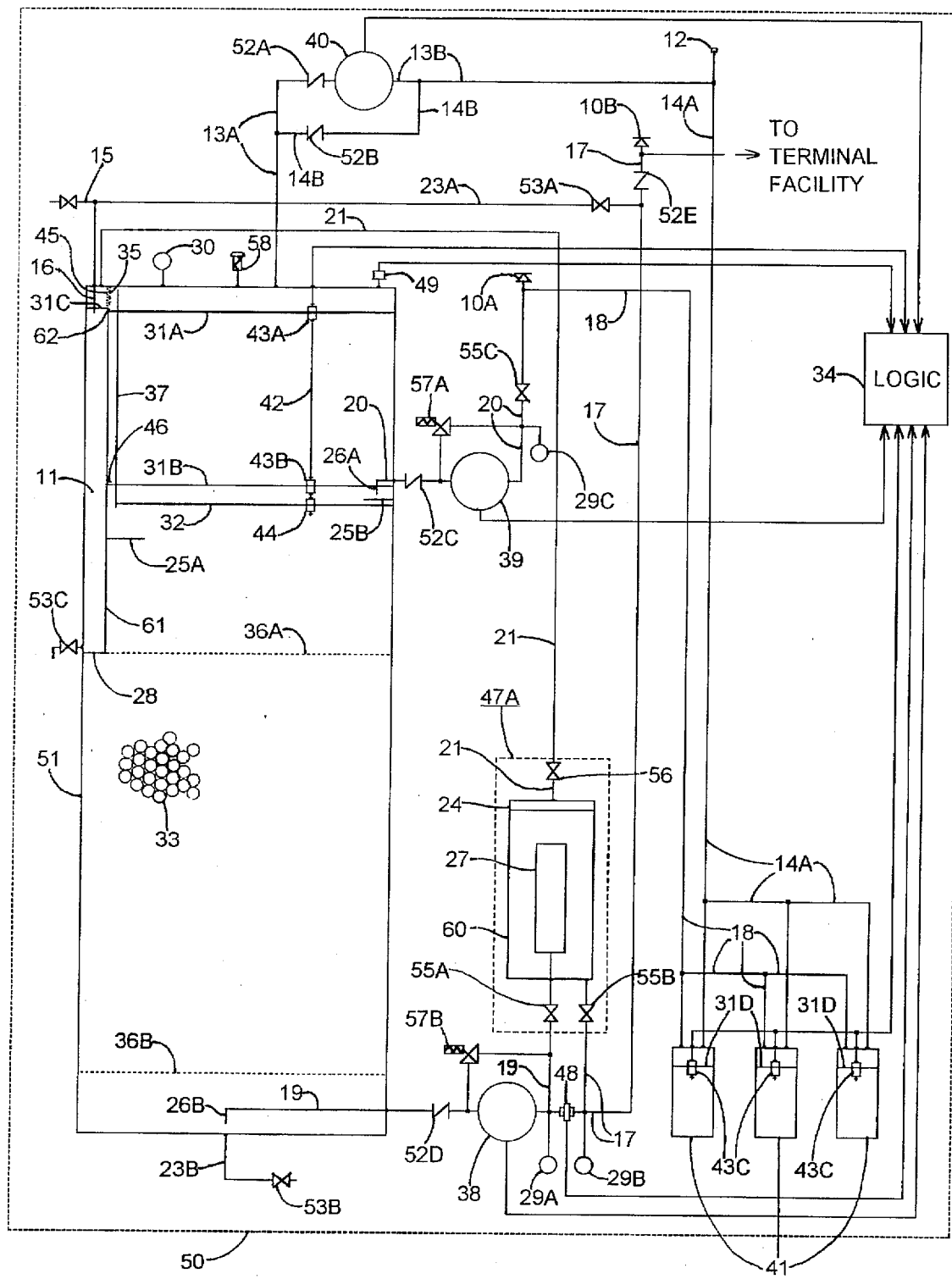
FIG. 3 is a total system schematic of the invention in single line form. While not to scale, it shows the relative positions of vacuum tank internal and connection details.

Referring to FIG. 3, wherein many more details of the main Mixed Immiscible Liquids Vacuum, Separation, and Disposal System 50 are depicted, interior details of vacuum tank 51 are shown, as well as all the other components and features which contribute to Mixed Immiscible Liquids Vacuum, Separation, and Disposal System 50 operational performance. Vacuum tank 51 is a closed, vertically oriented, cylinder capable of structurally withstanding a 28 inch Mercury vacuum without imploding, and without deforming appreciably from its resting, pressure-equalized, non-vacuum, condition. Vacuum tank 51 may also be oriented horizontally, however, adjustments to some of the features and details described below, which apply to a vertically oriented vacuum tank, will be necessary if a horizontal vacuum tank is employed.

Grit, sediment, particulate, and floating debris removal/collection chamber 11 is inside of, and integral to, vacuum tank 51. Grit, sediment, particulate, and floating debris removal/collection chamber 11 is formed by a grit, sediment, particulate, and floating debris removal/collection chamber floor 28, a grit, sediment, particulate, and floating debris removal/collection chamber wall 61, and the curved interior side of vacuum tank 51. A horizontal overflow weir 62 is the same as the top edge of grit, sediment, particulate, and floating debris removal/collection chamber wall 61, and therefore establishes the static height of a liquid surface control level 31C. Horizontal overflow weir 62 lies a relatively short distance below the inside top of vacuum tank 51, say about 3 inches. A perforated air baffle plate 35 connects to the inside top of vacuum tank 51, and lies in the same vertical plane as, and is the same width as, horizontal overflow weir 62. The ratio of the length of horizontal overflow weir 62 in inches compared to the throughput rate of Mixed Immiscible Liquids Vacuum, Separation, and Disposal System 50 in gallons per minute should be greater than 2:1. A small gap (say about 0.5 inch) separates the bottom of perforated air baffle plate 35 from horizontal overflow weir 62, and creates a vertical slot between the bottom of perforated air baffle plate 35 and horizontal overflow weir 62. A grit, sediment, particulate, and floating debris chamber barrier screen 45 is attached to, and spans the vertical slot created by, perforated air baffle plate 35 and horizontal overflow weir 62. Grit, sediment, particulate, and floating debris chamber barrier screen 45 also overlays all the holes in perforated air baffle plate 35. A drain valve 53C penetrating, and connected to, the side of vacuum tank 51, is located near the bottom of grit, sediment, particulate, and floating debris removal/collection chamber 11.

An upper liquid surface control level 31A is established in vacuum tank 51 and is controlled by an upper liquid surface level sensor 43A, which slides vertically along a guide rod 42 between two limit stops which restrict the vertical movement of upper liquid level sensor 43A. Upper liquid surface control level 31A is slightly below liquid surface control level 31C, say about 0.25 inch. Upper liquid surface level sensor 43A is selected to float when only partially immersed in the light phase. A lower liquid surface control level 31B is established in vacuum tank 51 and is controlled by a lower liquid surface level sensor 43B, which slides vertically along guide rod 42 between two limit stops which restrict the vertical movement of lower liquid level sensor 43B. Lower liquid surface level sensor 43B is selected to float when only partially immersed in the light phase. Lower liquid surface control level 31B is positioned below upper liquid surface control level 31A so that the quantity of any liquid in vacuum tank 51 resting at lower liquid surface control level 31B will represent about 75% of the total capacity of vacuum tank 51 minus the capacity of grit, sediment, particulate, and floating debris removal/collection chamber 11, and so that a molecule of heavy phase liquid which is resting at the left most edge of lower liquid surface control level 31B will take about 10 minutes to reach the horizontal level of a pipe elbow 26B, assuming plug flow liquid descent, when a heavy phase pump 38 starts and continuously runs at open, non-restricted, discharge. A phase interface control level 32 is established in vacuum tank 51 and controlled by a phase interface sensor 44, which slides vertically along guide rod 42 between two limit stops which restrict the vertical movement of phase interface sensor 44, as close to lower liquid surface level sensor 43B as the physical limitations of phase interface sensor 44 riding on guide rod 42 will permit, but not less than about 1 inch. Phase interface sensor 44 is selected to float only when almost all of its volume (say about 96%) is immersed in the heavy phase present, and to sink even if completely immersed in only the light phase that may be present. Upper liquid surface level sensor 43A, lower liquid surface level sensor 43B, and phase interface sensor 44 all connect electrically to a logic panel 34.

A floating light phase vertical barrier plate 37 parallels grit, sediment, particulate, and floating debris removal/collection chamber wall 61 say about 1 inch away horizontally and to the right of grit, sediment, particulate, and floating debris removal/collection chamber wall 61, and forms a partially enclosed (on 4 sides) narrow vertical box conduit which is open at the top and bottom. Floating light phase vertical barrier plate 37 connects along its sides to the interior curved sides of vacuum tank 51. A small gap, say about 0.125 inch, exists between the top horizontal edge of floating light phase vertical barrier plate 37 and the underside of the top of vacuum tank 51. Floating light phase vertical barrier plate 37 extends vertically and slightly below phase interface control level 32, say about 2 inches. A mixed immiscible liquids interceptor shelf 46 continuously connects horizontally, and spans the width of, grit, sediment, particulate, and floating debris removal/collection chamber wall 61 slightly above lower liquid surface control level 31B, say about 0.25 inch, and creates a small horizontal slot, say about 0.5 inch, all along its unconnected edge and the left face of floating light phase vertical barrier plate 37. A horizontal flow deflector 25A continuously connects horizontally, and spans the width of, grit, sediment, particulate, and floating debris removal/collection chamber wall 61, paralleling mixed immiscible liquids interceptor shelf 46. Mixed immiscible liquids interceptor shelf 46 is perpendicular to floating light phase vertical barrier plate 37. Horizontal flow deflector 25A lies slightly below the bottom horizontal edge of floating light phase vertical barrier plate 37, say about 2 inches. Horizontal flow deflector 25A projects about 2 inches perpendicularly from grit, sediment, particulate, and floating debris removal/collection chamber wall 61. Grit, sediment, particulate, and floating debris removal/collection chamber floor 28 should lie at the same elevation, or below, horizontal flow deflector 25A.

To increase grit, sediment, particulate, and floating debris removal/collection chamber 11 capacity, grit, sediment, particulate, and floating debris removal/collection chamber wall 61 can extend vertically to the bottom of vacuum tank 51, and/or grit, sediment, particulate, and floating debris removal/collection chamber wall 61 (and consequently grit, sediment, particulate, and floating debris removal/collection chamber floor 28 and perforated air baffle plate 35 and floating light phase vertical barrier plate 37) can also shift horizontally to the right toward, but should not pass, the centerline of vacuum tank 51. Preserving about a minimum 10 minute detention time for heavy phase molecules as mentioned above should be the prime design consideration.

A mixed immiscible liquids delivery conduit 16 connects directly to, and is an extension of, mixed immiscible liquids collection conduit(s) 15, and penetrates the top of vacuum tank 51. The lower end of mixed immiscible liquids delivery conduit 16 is open, and is submerged slightly below liquid surface control level 31C, say about 2 inches. Mixed immiscible liquids delivery conduit 16 is slotted (say about 0.25 inch wide×2 inches high) at its very top, with the slot faring left to the wall of vacuum tank 51.

A horizontal flow deflector 25B is established slightly above phase interface control level 32, say about 0.25 inch. Horizontal flow deflector 25B continuously and horizontally connects to vacuum tank 51. Horizontal flow deflector 25B provides about a 3 inch radius of continuous horizontal surface area from a vertical extension of the centerline of a pipe elbow 26A. Horizontal flow deflector 25B lies slightly below the port or opening of pipe elbow 26A, say about 1 inch.

An upper perforated oleophilic media containment plate 36A and a lower perforated oleophilic media containment plate 36B contains and supports a quantity of oleophilic media 33. The ratio of oleophilic media 33 in cubic feet to the throughput of Mixed Immiscible Liquids Vacuum, Separation, and Disposal System 50 in gallons per minute should be no less than 0.6:1. Lower perforated oleophilic media containment plate 36B is established horizontally and attached to vacuum tank 51 slightly above the port or opening of pipe elbow 26B, say about 2 inches. Upper perforated oleophilic media containment plate 36A is established horizontally and attached to vacuum tank 51 above pipe elbow 26B at a sufficient distance to accommodate the volume of oleophilic media 33 employed. Upper perforated oleophilic media containment plate 36A and lower perforated oleophilic media containment plate 36B may connect to grit, sediment, particulate, and floating debris removal/collection chamber wall 61 if necessary.

A vacuum switch 49, a vacuum relief valve 58, and a vacuum gauge 30 all connect to vacuum tank 51. Vacuum switch 49, vacuum relief valve 58, and vacuum gauge 30 can be connected directly and/or indirectly to vacuum tank 51 in a variety of methods, and can be mounted in a variety of positions. Preferably, neither vacuum switch 49, vacuum relief valve 58, nor vacuum gauge 30 should be connected to vacuum tank 51 so that any liquid can contaminate their respective internal parts. Vacuum switch 49 connects electrically to logic panel 34.

A vacuum pump 40 connects to the top of vacuum tank 51, at a point well above upper liquid surface control level 31A, through a vacuum pump air conduit 13A. Vacuum pump 40 connects electrically to logic panel 34. A self-closing check valve 52A is installed in vacuum pump air conduit 13A between vacuum pump 40 and vacuum tank 51. Vacuum pump 40 also connects to an air vent conduit 14A by a vacuum pump air conduit 13B. A self-closing, low cracking pressure (say less than 0.5 pounds per square inch gauge) check valve 52B is installed in an air vent conduit 14B, and in parallel with vacuum pump 40 and check valve 52A, and between vacuum tank 51 and air vent conduit 14A.

As mentioned above, pipe elbow 26B is located inside vacuum tank 51 below (or downstream of) oleophilic media 33, which is below (or downstream of) phase interface control level 32, which is below (or downstream of) lower liquid surface control level 31B, which is below (or downstream of) upper liquid surface control level 31A, and which is below (or downstream of) liquid surface control level 31C. The distance as represented by plug flow time between pipe elbow 26B and lower liquid surface control level 31B should be about 10 minutes. Furthermore, pipe elbow 26B is oriented with its port or opening horizontal in a downturned fashion. Pipe elbow 26B connects to partially treated heavy phase conduit 19, which connects to a check valve 52D, which connects to heavy phase pump 38. A pressure relief valve 57B connects into partially treated heavy phase conduit 19 at the outlet of check valve 52D and the inlet of heavy phase intermediate separation stage 47A in parallel with heavy phase pump 38. The inlet of pressure relief valve 57B connects to the outlet of heavy phase pump 38. The outlet of pressure relief valve 57B connects to the inlet of heavy phase pump 38. The outlet of heavy phase pump 38 also connects to partially treated heavy phase conduit 19, which connects to heavy phase intermediate separation stage 47A, which connects to heavy phase intermediate separation stage light phase return conduit 21 and heavy phase discharge conduit 17. Heavy phase pump 38 connects electrically to logic panel 34.

Heavy phase discharge conduit 17 connects heavy phase intermediate separation stage 47A and a check valve 52E and a drain valve 53A. Continuing from check valve 52E, heavy phase discharge conduit 17 then connects to a siphon breaker 10B and the final terminal facility for the heavy phase, which can be one or many of a number of choices previously discussed.

A drain conduit 23A connects drain valve 53A into mixed immiscible liquids collection conduit 15 near the penetration point of mixed immiscible liquids collection conduit 15 at vacuum tank 51.

A differential pressure switch 48 taps into partially treated heavy phase conduit 19 on the outlet side of heavy phase pump 38 and heavy phase discharge conduit 17 on the outlet side of intermediate separation stage 47A. Two pressure gauges 29A and 29B also tap off partially treated heavy phase conduit 19 and heavy phase discharge conduit 17 on the outlet of heavy phase pump 38 and heavy phase intermediate separation stage 47A, respectively. Differential pressure switch 48 connects electrically to logic panel 34.

Heavy phase intermediate separation stage 47A is comprised of manually actuated and controlled valves 55A and 55B, a heavy phase intermediate separation stage vessel 60, an heavy phase intermediate separation stage vessel cover 24, a coalescing filter 27 installed and supported inside heavy phase intermediate separation stage vessel 60, and a metering valve 56 connected by heavy phase intermediate separation stage light phase return conduit 21 to heavy phase intermediate separation stage vessel cover 24. Heavy phase intermediate separation stage light phase return conduit 21 connects heavy phase intermediate separation stage 47A at metering valve 56 into vacuum tank 51, penetrating vacuum tank 51 at the top of, and directly over grit, sediment, particulate, and floating debris removal/collection chamber 11. Heavy phase intermediate separation stage light phase return conduit 21 should not connect into mixed immiscible liquids collection conduit 15.

Pipe elbow 26A is located inside vacuum tank 51 with its opening between lower liquid surface control level 31B and phase interface control level 32. Pipe elbow 26A is oriented with its port or opening horizontal in a downturned fashion. Pipe elbow 26A connects to partially treated light phase conduit 20, which connects to a check valve 52C which connects to a light phase pump 39. Light phase pump 39 connects electrically to logic panel 34. A pressure relief valve 57A connects into partially treated light phase conduit 20 at the outlet of check valve 52C and the inlet of a valve 55C in parallel with light phase pump 39. The inlet of pressure relief valve 57A connects to the outlet of light phase pump 39. The outlet of pressure relief valve 57A connects to the inlet of light phase pump 39. The outlet of light phase pump 39 also connects to partially treated light phase conduit 20, which connects to valve 55C and a pressure gauge 29C, which connects via light phase discharge conduit 18 into siphon breaker 10A. Light phase discharge conduit 18 from siphon breaker 10A connects one or many light phase receptacle(s) 41. Air vent conduit 14A connects light phase receptacle(s) 41 to an air vent conduit cap 12. A liquid surface control level 31D is established and controlled by a liquid surface level sensor 43C in each light phase receptacle 41. Liquid surface control level 31D is slightly below the top of light phase receptacle 41, say about 2 inches. Liquid surface level sensor 43C is selected to float when only partially immersed in the light phase. Each liquid surface level sensor 43C connects electrically to logic panel 34.

A drain valve 53B penetrating, and connected to, vacuum tank 51 by a drain conduit 23B, is located at the bottom exterior of vacuum tank 51.

Figure 4:
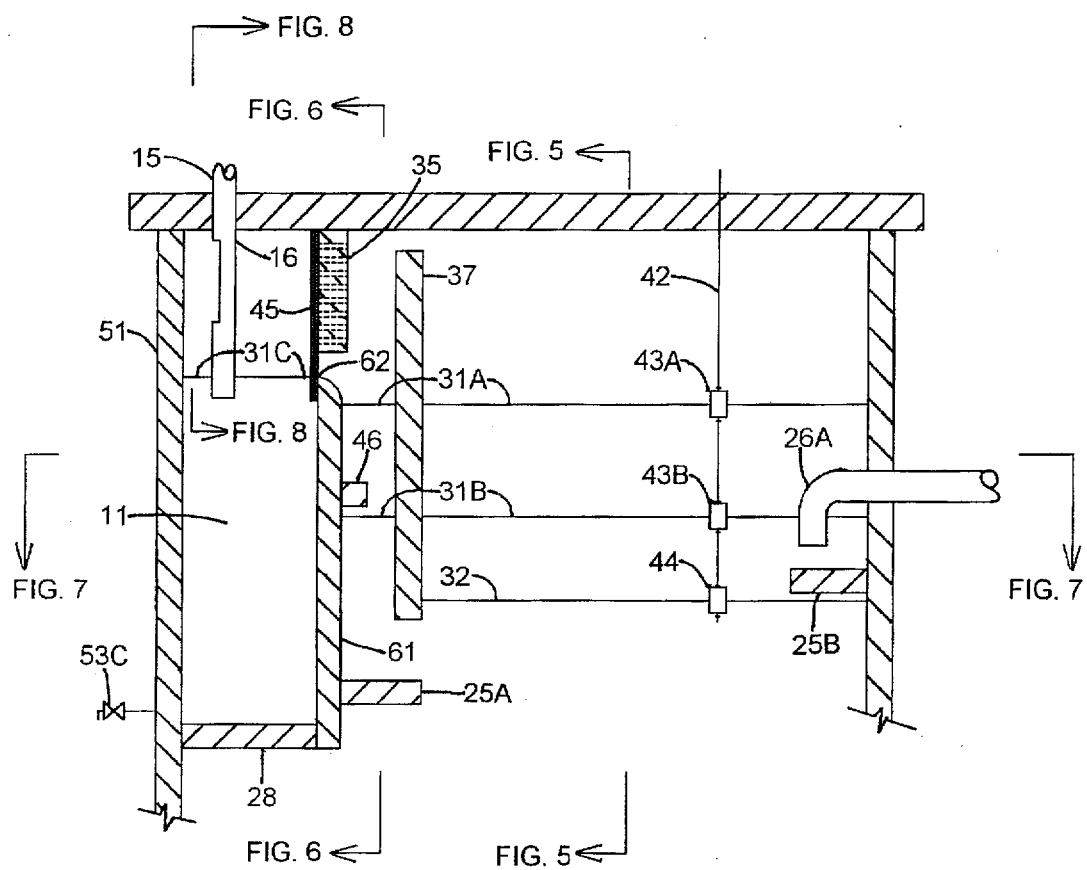
FIG. 4 is a cross section in elevation through the top of the vacuum tank in its preferred embodiment showing more details of the liquid delivery piping, overflow weir, baffling arrangement, and light phase pump suction conduit details inside the vacuum tank. This figure is not to scale.

FIG. 4 shows the physical details at the top of vacuum tank 51 in its preferred embodiment for 6 gallon per minute throughput. The vacuum tank 51, grit, sediment, particulate, and floating debris removal/collection chamber 11, grit, sediment, particulate, and floating debris removal/collection chamber wall 61, grit, sediment, particulate, and floating debris removal/collection chamber floor 28, mixed immiscible liquids interceptor shelf 46, liquid surface control level 31 C, horizontal flow deflector 25A, floating light phase vertical barrier plate 37, grit, sediment, particulate, and floating debris chamber barrier screen 45, perforated air baffle plate 35, mixed immiscible liquids delivery conduit 16, mixed immiscible liquids collection conduit 15, pipe elbow 26A, horizontal flow deflector 25B, and drain valve 53C shown in schematic in FIG. 3 are shown here in more detail. Also depicted are horizontal overflow weir 62, upper liquid surface control level 31A, lower liquid surface control level 31B, phase interface control level 32, guide rod 42, upper liquid surface level sensor 43A, lower liquid surface level sensor 43B, and phase interface sensor 44. This figure is not to scale.

Figure 5:
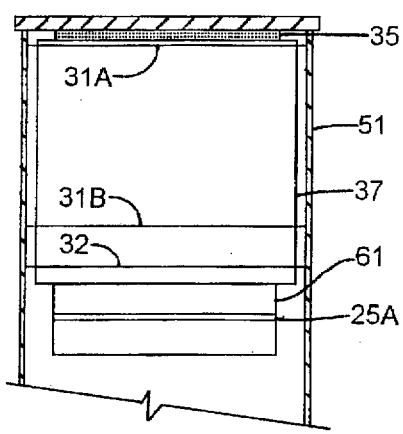
FIG. 5 is a cross section in elevation through the top of the vacuum tank in its preferred embodiment, rotated 90 degrees counter clockwise on its vertical axis from the cross section in FIG. 4, showing another view of the internal baffling arrangement. This figure is not to scale.

FIG. 5 shows another view of the top of vacuum tank 51 as cut in FIG. 4. The vacuum tank 51, grit, sediment, particulate, and floating debris removal/collection chamber wall 61, horizontal flow deflector 25A, floating light phase vertical barrier plate 37, perforated air baffle plate 35, upper liquid surface control level 31A, lower liquid surface control level 31B, and phase interface control level 32 shown in FIG. 4 in cross section are now shown in face elevation. This figure is not to scale.

Figure 6:
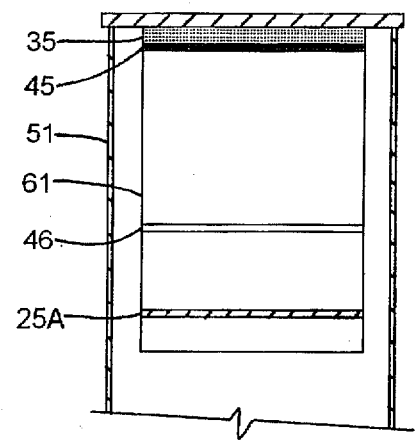
FIG. 6 is the same as FIG. 5, but removes the floating light phase vertical barrier plate to expose more details of the baffling behind it. This figure is not to scale.

FIG. 6 is the same as FIG. 5, with floating light phase vertical barrier plate 37 removed to reveal mixed immiscible liquids interceptor shelf 46 and grit, sediment, particulate, and floating debris chamber barrier screen 45. This figure is not to scale.

Figure 7:
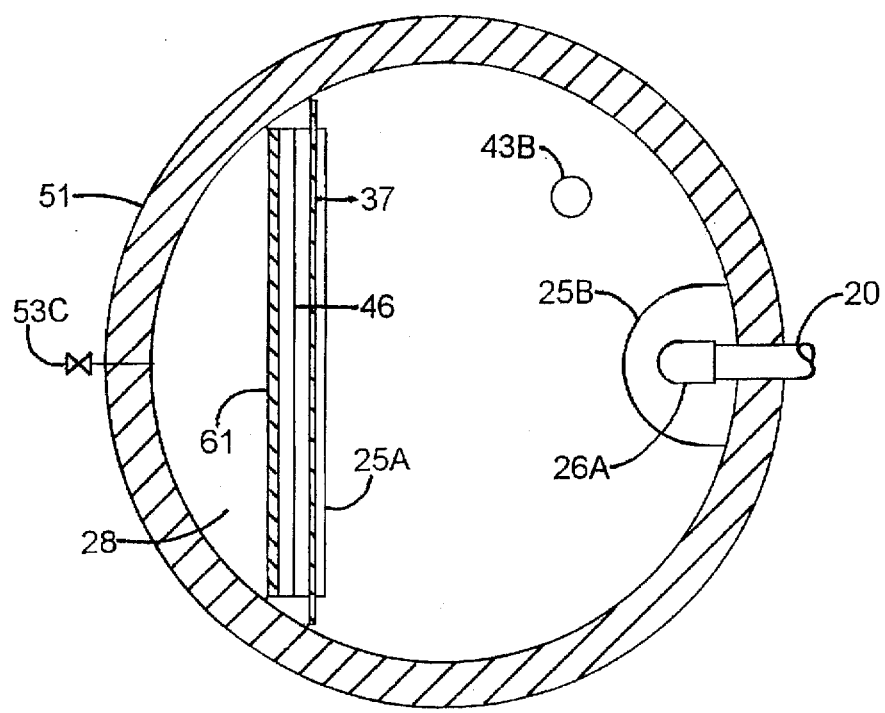
FIG. 7 is a cross section in plan through the top of the vacuum tank in its preferred embodiment showing more details of the baffling arrangment and light phase suction conduit inside the vacuum tank. This figure is not to scale.

FIG. 7 is a section in plan as cut in FIG. 4. Vacuum tank 51, horizontal flow deflector 25B, pipe elbow 26A, partially treated light phase conduit 20, horizontal flow deflector 25A, grit, sediment, particulate, and floating debris removal/collection chamber wall 61, mixed immiscible liquids interceptor shelf 46, floating light phase vertical barrier plate 37, lower liquid surface level sensor 43B, grit, sediment, particulate, and floating debris removal/collection chamber floor 28, and drain valve 53C are shown. This figure is not to scale.

Figure 8:
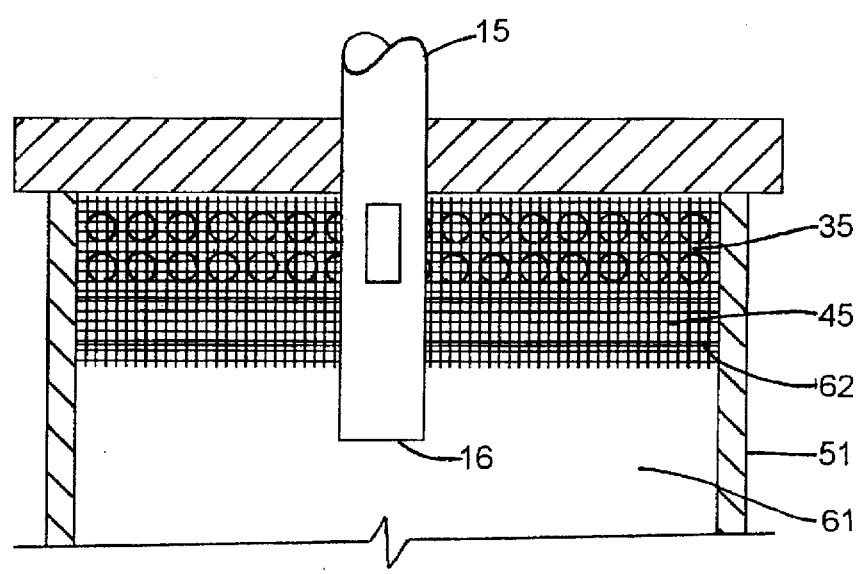
FIG. 8 is a cross section in elevation through the top left corner of the vacuum tank in its preferred embodiment showing more details of the mixed immiscible liquids delivery conduits, overflow weir, perforated air baffle, and debris screen. This figure is not to scale.

FIG. 8 is a magnified cross-sectional detail as cut from FIG. 4. Vacuum tank 51, mixed immiscible liquids collection conduit 15, mixed immiscible liquids delivery conduit 16, grit, sediment, particulate, and floating debris chamber barrier screen 45, perforated air baffle plate 35, grit, sediment, particulate, and floating debris removal/collection chamber wall 61, and horizontal overflow weir 62 are shown. This figure is not to scale.

Referring again to FIG. 1, upon initial entry into a Mixed Immiscible Liquids Vacuum, Separation, and Disposal System, 50, any air and grit, sediment, particulates, and floatable debris contained in the mixed immiscible liquids inflow stream are first eliminated from the mixed immiscible liquids inflow stream. Mixed immiscible liquids then flow to an initial phase separation stage, whereupon each respective partially or totally separated phase is then temporarily stored. From temporary storage, each respective partially or totally separated phase then flows to either a(n) optional intermediate separation stage(s) or to its respective terminal facility. If a(n) optional intermediate separation stage(s) is/are used, then the predominant phase exiting the intermediate separation stage(s) may either flow to its respective terminal facility or return to temporary storage, joining its respective phase. If a(n) optional intermediate separation stage(s) is/are used, then the subdominant phase flowing from that particular intermediate separation stage can either flow to its respective predominant intermediate separation stage or to its terminal facility, can return to temporary storage, joining its respective phase, or can be locally trapped at the intermediate separation stage.

Referring to FIG. 2, vacuum tank 51 is under a constant, automatically regulated vacuum, the air from vacuum tank 51 exhausting through vacuum pump air conduit 13. Mixed immiscible liquids from their respective sources will flow in mixed immiscible liquids collection conduit(s) 15 towards vacuum tank 51 when any one, or all, of any combination or number of float, or mechanically actuated and controlled valve(s) 54, manually actuated and controlled valve(s) 55, or solenoid, motorized, or other electrically actuated and controlled valve(s) 59 open(s). Mixed immiscible liquids flow will continue as long as any float, or mechanically actuated and controlled valve 54, manually actuated and controlled valve 55, or solenoid, motorized, or other electrically actuated and controlled valve 59 remains open. Mixed immiscible liquids flow, once inside mixed immiscible liquids collection conduit(s) 15, proceeds to grit, sediment, particulate, and floating debris removal/collection chamber 11, where grit, sediment, particulates, and/or floating debris is removed. Mixed immiscible liquids flow then continues from grit, sediment, particulate, and floating debris removal/collection chamber 11 in mixed immiscible liquids collection conduit 15, where any air entrained with the mixed immiscible liquids flow is removed. Initial phase separation also occurs in vacuum tank 51 upon mixed immiscible liquids introduction through basic immiscibility and specific gravity differences of the mixed immiscible liquids when resting in a relatively static, quiescent, temporary storage condition. In addition, low grade dissolved air flotation induced by the constant vacuum in vacuum tank 51 enhances initial gravity separation.

The partially separated heavy phase from vacuum tank 51 flows to heavy phase intermediate separation stage 47A through partially treated heavy phase conduit 19. Light phase liquids separated by heavy phase intermediate separation stage 47A return to vacuum tank 51 through heavy phase intermediate separation stage light phase return conduit 21, joining any pre-existent separated light phases at the top of vacuum tank 51. Heavy phases further separated by heavy phase intermediate separation stage 47A flow through heavy phase discharge conduit 17 to their respective terminal facilities.

The partially separated light phase from vacuum tank 51 flows to light phase intermediate separation stage 47B through partially treated light phase conduit 20. Heavy phase liquids separated by light phase intermediate separation stage 47B return to vacuum tank 51 through light phase intermediate separation stage heavy phase return conduit 22, joining any pre-existent separated heavy phases at the bottom of vacuum tank 51. Light phases further separated by light phase intermediate separation stage 47B flow through light phase discharge conduit 18 to their respective terminal facilities.

Referring again to FIG. 3, logic panel 34 is energized, liquid surface control level 31C exists, and the free liquid surface in the main portion vacuum tank 51 is between upper liquid surface control level 31A and lower liquid surface control level 31B. Vacuum switch 49, liquid surface level sensor 43C, and upper liquid surface level sensor 43A controls vacuum pump 40 through logic panel 34. Vacuum pump 40 runs whenever the vacuum intensity in vacuum tank 51 is less than the vacuum intensity control setting of vacuum switch 49, provided also that the liquid level free surface in light phase receptacle(s) 41 is below liquid surface control level 31D as sensed by liquid surface level sensor 43C, and provided that the liquid level free surface in vacuum tank 51 is below upper liquid surface control level 31A as sensed by upper liquid surface level sensor 43A. Vacuum pump 40 does not run whenever the vacuum intensity in vacuum tank 51 matches, or is higher than, the vacuum intensity setting of vacuum switch 49, nor whenever the liquid level in light phase receptacle(s) 41 is at, or above, liquid surface control level 31D as sensed by liquid surface level sensor 43C, nor whenever the liquid level free surface in vacuum tank 51 is at, or below, upper liquid surface control level 31A as sensed by upper liquid surface level sensor 43A. When running, vacuum pump 40 causes the vacuum intensity in vacuum tank 51 to increase by evacuating the air above any liquid level free surfaces in vacuum tank 51 from vacuum tank 51 through vacuum pump air conduit 13A, check valve 52A, and vacuum pump air conduit 13B into air vent conduit 14A and out air vent conduit cap 12. Any oil and water vapors in the exhaust air of vacuum pump 40 that condense in vacuum pump air conduit 13B or in the vertical section of air vent conduit 14A just below air vent conduit cap 12 will flow to air vent conduit 14A and drain via air vent conduit 14A into light phase receptacle(s) 41. When vacuum pump 40 is not running, the vacuum intensity in vacuum tank 51 tends to pull air back through air vent conduit cap 12, vacuum pump air conduit 13B, vacuum pump 40, and vacuum pump air conduit 13A. However check valve 52A seals the vacuum intensity in vacuum tank 51 by preventing reverse air flow in vacuum pump air conduit 13A. In the preferred embodiment, check valve 52A is a spring loaded pneumatic check valve matched to the dynamic air flow characteristics of vacuum pump 40. Check valve 52A could also be a solenoid valve which opens when vacuum pump 40 runs and closes when vacuum pump 40 stops. If for some reason electric power fails to Mixed Immiscible Liquids Vacuum, Separation, and Disposal System 50, and if the vacuum intensity in vacuum tank 51 is lost completely before electric power is restored, positive air pressure inside vacuum tank 51 could build, which would violate codes and possibly cause a rupture or explosion of vacuum tank 51, which could cause a safety hazard. Check valve 52B, while sealing the vacuum in vacuum tank 51 during the normal operating conditions described above, provides automatic pressure relief directly to the atmosphere (that is, without passing through check valve 52A or vacuum pump 40) should a positive pressure develop in vacuum tank 51. In the preferred embodiment, check valve 52B is a self-closing pneumatic check valve with a very low cracking pressure, say less than 0.5 psig. Check valve 52B could also be a solenoid valve which opens automatically whenever power to Mixed Immiscible Liquids Vacuum, Separation, and Disposal System 50 fails or whenever the vacuum intensity in vacuum tank 51 falls below 0 inches Mercury.

Vacuum relief valve 58 is set to automatically admit atmospheric air whenever the vacuum intensity in vacuum tank 51 is slightly above the vacuum intensity control point or the upper limit of the vacuum intensity control range of vacuum switch 49, by say about 2 inches Mercury. Vacuum relief valve 58 serves three purposes: (1) to ensure that the vacuum intensity in vacuum tank 51 does not appreciably exceed the control setting of vacuum switch 49, which, under some mixed liquid collection circumstances where the vertical liquid lift height is relatively low, (say less than 8 feet) and the size of mixed immiscible liquids collection conduit 15 is relatively large (say over 3 inches in diameter), would transport the mixed immiscible liquids too fast, which could agitate and emulsify the mixed immiscible liquids unnecessarily; (2) helps ensure that the net positive suction head available at heavy phase pump 38 and a light phase pump 39 does not exceed the net positive suction head required by heavy phase pump 38 and light phase pump 39; and (3) provides a source of air to vacuum pump 40 to prevent overheating and damage of vacuum pump 40 if vacuum pump 40 runs while not under the control of vacuum switch 49.

Vacuum gauge 30 provides a visual measurement of the vacuum intensity in vacuum tank 51.

Mixed liquids and any entrained air flow through mixed immiscible liquids collection conduit 15 into vacuum tank 51 due to the vacuum maintained in vacuum tank 51. Mixed liquid flow into vacuum tank 51 can be continuous or intermittent with absolutely no adverse affect on Mixed Immiscible Liquids Vacuum, Separation, and Disposal System 50 performance. Any entrained air in mixed immiscible liquids collection conduit 15 immediately escapes through the slot in the top of mixed immiscible liquids delivery conduit 16, is deflected by vacuum tank 51 back around mixed immiscible liquids delivery conduit 16, passes through grit, sediment, particulate, and floating debris chamber barrier screen 45 and perforated air baffle plate 35, passes over floating light phase vertical barrier plate 37, and is eventually drawn into vacuum pump air conduit 13A.

Mixed liquid flows downward through and to the bottom of mixed immiscible liquids delivery conduit 16, which lies slightly below liquid surface control level 31C. Grit, sediment, and other particles separate from the liquid stream at the bottom of mixed immiscible liquids delivery conduit 16 and settle to the bottom of grit, sediment, particulate, and floating debris removal/collection chamber 11. Grit, sediment, particulate, and floating debris chamber barrier screen 45 traps large floating particles, preventing them from entering the main portion of vacuum tank 51, thereby ensuring that upper liquid surface level sensor 43A and lower liquid surface level sensor 43B will not become fouled by floating debris, which could cause their malfunction. Drain valve 53C is used to remove grit, sediment, and particles from grit, sediment, particulate, and floating debris removal/collection chamber 11.

Mixed liquids introduced into grit, sediment, particulate, and floating debris removal/collection chamber 11 at mixed immiscible liquids delivery conduit 16 flow over horizontal overflow weir 62 and fall in a sheet along the right side of grit, sediment, particulate, and floating debris removal/collection chamber wall 61, where mixed immiscible liquids interceptor shelf 46 intercepts the vertical flow, redirecting it to the right, where any air dragged below the current free surface by the downward velocity of cascading mixed immiscible liquids separates and bubbles to the free surface within the chamber formed by grit, sediment, particulate, and floating debris removal/collection chamber wall 61 and floating light phase vertical barrier plate 37. Mixed liquid continues its descent, passing below the bottom edge of floating light phase vertical barrier plate 37 and entering the main portion of vacuum tank 51. Horizontal flow deflector 25A ensures falling sheets of mixed liquids do not continue to flow downward and mix with partially separated heavy phase liquids at, and below, this level. Horizontal flow deflector 25A redirects influent flow to the right. Once in the main portion of vacuum tank 51, liquid/liquid separation automatically begins. As mixed immiscible liquids continue to enter vacuum tank 51 at mixed immiscible liquids delivery conduit 16, liquid surface control level 31C rises only slightly to a dynamic level sufficient to overflow horizontal overflow weir 62, whereas the free surface in the main portion of vacuum tank 51 rises continuously and proportionately with mixed liquid flow. Eventually mixed liquid flow into vacuum tank 51 will raise the free surface in vacuum tank 51 to upper liquid surface control level 31A.

Upper liquid surface level sensor 43A, lower liquid surface level sensor 43B, liquid surface level sensor 43C, and phase interface sensor 44 control heavy phase pump 38 and light phase pump 39 through logic panel 34. Heavy phase pump 38 and light phase pump 39 can never run simultaneously. Neither heavy phase pump 38 nor light phase pump 39 will run whenever the free liquid surface in the main portion of vacuum tank 51 is at, or below, lower liquid surface control level 31B as sensed by lower liquid surface level sensor 43B, nor whenever the liquid level in light phase receptacle(s) 41 is at, or above, liquid surface control level 31D as sensed by liquid surface level sensor 43C. If the free liquid surface in the main portion of vacuum tank 51 is at, or above, upper liquid surface control level 31A as sensed by upper liquid surface level sensor 43A, and the phase interface in the main portion of vacuum tank 51 is above phase interface control level 32 as sensed by phase interface sensor 44, then heavy phase pump 38 will run. If the free liquid surface in the main portion of vacuum tank 51 is at, or above, upper liquid surface control level 31A as sensed by upper liquid surface level sensor 43A, and the phase interface in the main portion of vacuum tank 51 is at, or below, phase interface control level 32 as sensed by phase interface sensor 44, then light phase pump 39 will run. Whenever heavy phase pump 38 is running and the phase interface in the main portion of vacuum tank 51 descends to phase interface control level 32 as sensed by phase interface sensor 44, then heavy phase pump 38 will stop and light phase pump 39 will run. Whenever light phase pump 39 is running and the phase interface in the main portion of vacuum tank 51 ascends above phase interface control level 32 as sensed by phase interface sensor 44, then light phase pump 39 will stop and heavy phase pump 38 will run.

Whenever the heavy phase is water and the light phase is oil, heavy phase pump 38 runs as controlled by upper liquid surface level sensor 43A and phase interface sensor 44, heavy phase liquid below phase interface control level 32 in vacuum tank 51 is drawn downward through oleophilic media 33 and into pipe elbow 26B. Oleophilic media 33 is selected to attract any light phase liquids or droplets dispersed in the heavy phase while simultaneously repelling the heavy phase. Oleophilic media 33 is also selected to be continuously self-cleaning. During heavy phase descent through oleophilic media 33, any dispersed light phase droplets that have not already separated from the heavy phase and risen and joined any light phase floating on top of the heavy phase contact the surfaces of oleophilic media 33, which attracts these dispersed light phase droplets. On the surface of oleophilic media 33, these dispersed light phase droplets can coalesce into larger ones, which eventually grow large enough to separate from the surface of oleophilic media 33 and rise through the heavy phase at a velocity faster than the average overall downward velocity (plug flow) of the heavy phase. Any rising light phase droplets originating from relatively deep in the oleophilic media 33 bed typically impinge on other oleophilic media 33 surfaces, causing them to attach again, grow again, separate again, and rise again. This attachment, separation, detachment, and ascent cycle continues until rising droplets no longer encounter any oleophilic media 33 during their ascent. In the meantime, the heavy phase liquid contains lesser and lesser dispersed light phase droplets as it passes through oleophilic media 33.

Once exiting through oleophilic media 33, the heavy phase liquid, now free of much of the finely dispersed light phase droplets, enters pipe elbow 26B. Heavy phase pump 38 pulls the heavy phase liquid through partially treated heavy phase conduit 19 and check valve 52D. Check valve 52D prevents heavy phase backflow into vacuum tank 51 when heavy phase pump 38 is off. In the preferred embodiment, check valve 52D is a vertically oriented ball check valve. Check valve 52D could also be a normally closed solenoid or motorized valve which opens whenever heavy phase pump 38 starts and runs, and closes whenever heavy phase pump 38 stops. Check valve 52D could also be another type of check valve, such as a self-closing model, where its satisfactory operation is not dependent on its physical orientation.

Heavy phase pump 38 discharges heavy phase liquids through partially treated heavy phase conduit 19 into intermediate separation stage 47A. In the preferred embodiment, heavy phase pump 38 is a positive displacement, low shear, pump. In this embodiment, pressure relief valve 57B limits heavy phase pump 38 discharge pressure, which protects heavy phase pump 38, intermediate separation stage 47A, and all associated piping, tubing, and other connected devices. If the pressure at the discharge of heavy phase pump 38 exceeds the control setting of pressure relief valve 57B, the valve in pressure relief valve 57B opens, allowing liquid to return to the inlet of heavy phase pump 38.

In heavy phase supplemental separation stage 47A, heavy phase liquids pass through manually actuated and controlled valve 55A into heavy phase supplemental separation stage vessel 60 which holds coalescing filter 27. Coalescing filter 27 is selected to dynamically separate very finely dispersed, or emulsified, light phase droplets from the heavy phase carrier. In the preferred embodiment where the heavy phase liquid is water or seawater and the light phase liquid is waste lubricating, fuel, or vegetable oil, coalescing filter 27 is a coalescer filter element made by any one of a number of manufacturers, such as FACET, SAREX, or SERFILCO. Coalescing filter 27 could also be one of many other devices which can separate the mixed immiscible liquids, such as an ultrafiltration membrane. In the preferred embodiment, liquid entering heavy phase supplemental separation stage vessel 60 flows through coalescing filter 27 from the inside to the outside. While passing through coalescing filter 27, finely dispersed light phase droplets coalesce, grow, and form large droplets on the outside surface of coalescing filter 27, which separate from coalescing filter 27 and ascend to the top of heavy phase supplemental separation stage vessel, where heavy phase supplemental separation stage light phase return conduit 21 carried both phases through metering valve 56 into vacuum tank 51 at the top of grit, sediment, particulate, and floating debris removal/collection chamber 11, whereupon they reenter the main portion of vacuum tank 51 as described above, separate again, and finally rejoin their respective phases in vacuum tank 51. Metering valve 56 is adjusted to prevent turbulent flow in heavy phase supplemental separation stage light phase return conduit 21 without causing accumulation of separated light phase liquid at the top of heavy phase supplemental separation stage vessel 60. Heavy phase supplemental separation stage vessel cover 24 is provided for heavy phase supplemental separation stage vessel 60 to permit access to coalescing filter 27 for maintenance or replacement.

Heavy phase liquids passing through coalescing filter 27 flow out the bottom of heavy phase supplemental separation stage vessel 60 and manually actuated and controlled valve 55B into heavy phase discharge conduit 17 through check valve 52E and past siphon breaker 10B to their terminal facility. Check valve 52E prevents heavy phase backflow and air leakage into vacuum tank 51 through heavy phase discharge conduit 17, intermediate heavy phase separation stage vessel 60, and heavy phase intermediate separation stage light phase return conduit 21, which would otherwise occur due to the constant vacuum in vacuum tank 51. In the preferred embodiment, check valve 52E is a vertically oriented ball check valve. Check valve 52E could also be a normally closed solenoid or motorized valve which opens whenever heavy phase pump 38 starts and runs, and closes whenever heavy phase pump 38 stops. Check valve 52E could also be another type of check valve, such as a self-closing model, where its satisfactory operation is not dependent on its physical orientation. Siphon breaker 10B prevents the inadvertent siphonage of the contents of vacuum tank 51 at pipe elbow 26B through check valve 52D, heavy phase pump 38, heavy phase intermediate separation stage 47A, and check valve 52E via partially treated heavy phase conduit 19 and heavy phase discharge conduit 17 if, for example, heavy phase pump 38 were running at the time of a total power failure to Mixed Immiscible Liquids Vacuum, Separation, and Disposal System 50 and vacuum tank 51 was not under vacuum and was open to the atmosphere.

Through taps into partially treated heavy phase conduit 19 and heavy phase discharge conduit 17 at the inlet and outlet of heavy phase supplemental heavy phase separation stage vessel 60, differential pressure switch 48 senses the differential pressure entering and exiting heavy phase supplemental separation stage 47A. Differential pressure switch 48 controls visual and/or audible alarms (not shown), and/or other Mixed Immiscible Liquids Vacuum, Separation, and Disposal System 50 functions as selected through logic panel 34. In the preferred embodiment, whenever the differential pressure matches or exceeds the control setting of differential pressure switch 48, say by about 20 pounds per square inch gauge, logic panel 34 connects and maintains power to remote and/or local visual and audible alarms to alert personnel that coalescing filter 27 is probably fouled or plugged, and therefore requires replacement to preserve design throughput flow. Two pressure gauges 29A and 29B tapped into partially treated heavy phase conduit 19 at the inlet and outlet of heavy phase supplemental separation stage vessel 60 measure the respective inlet and outlet pressures at heavy phase supplemental separation stage vessel 60. A single differential pressure gauge, or a compound readout pressure gauge could also be used to provide an alternate means to determine the differential pressure.

Drain valve 53A is normally closed. Drain valve 53A is opened to vacuum-drain the contents of heavy phase supplemental separation stage vessel 60 into vacuum tank 51 through drain conduit 23A, mixed immiscible liquids collection conduit 15, and mixed immiscible liquids delivery conduit 16 whenever servicing of heavy phase supplemental separation stage vessel 60 or coalescing filter 27 is required. In the preferred embodiment, drain valve 53A is a manually operated ball valve. Other types of valves can also be used. One procedure to drain heavy phase supplemental separation stage vessel 60 follows. Close metering valve 56. Run heavy phase pump 38 manually for about 5 seconds to purge any residual vacuum from heavy phase supplemental separation stage vessel 60. Loosen or remove heavy phase supplemental separation stage vessel cover 24. Open drain valve 53A. The vacuum in vacuum tank 51 will pull the liquid from heavy phase supplemental separation stage vessel 60 through its normal outlet through heavy phase discharge conduit 17 and drain conduit 23A into vacuum tank 51. As liquid flows, atmospheric air will enter heavy phase supplemental separation stage vessel 60 to replace the volume of liquid removed. Close drain valve 53A when heavy phase intermediate separation stage vessel 60 is empty or sooner. Other heavy phase supplemental separation stage vessel 60 drainage procedures using optional additional devices, such as self-closing quick-disconnect fittings installed in heavy phase supplemental separation stage light phase return conduit 2t, or purge valves installed in heavy phase supplemental separation stage vessel cover 24, are available.

Whenever light phase pump 39 runs as controlled by upper liquid surface level sensor 43A and phase interface sensor 44, light phase liquid above phase interface control level 32 in the main portion of vacuum tank 51 enters partially treated light phase conduit 20 through pipe elbow 26A. Horizontal flow deflector 25B prevents heavy phase liquids from entering pipe elbow 26A when light phase pump 39 runs, which would otherwise occur because of the influence zone and flow gradient immediately below, and created by the downturned orientation of, pipe elbow 26A. As noted previously in the description of the invention section above, the orientation of pipe elbow 26A in a downturned manner traps light phase liquid in partially treated light phase conduit 20 while excluding heavy phase liquids when pipe elbow 26A is submerged in heavy phase liquid. Light phase pump 39 pulls the light phase liquid through partially treated light phase conduit 20 and check valve 52C. Check valve 52C prevents light phase backflow and air leakage into vacuum tank 51 through light phase discharge conduit 18, light phase pump 39, and partially treated light phase conduit 20, which would otherwise occur due to the constant vacuum in vacuum tank 51. In the preferred embodiment, check valve 52C is a vertically oriented ball check valve. Check valve 52C could also be a normally closed solenoid or motorized valve which opens whenever light phase pump 39 starts and runs, and closes whenever light phase pump 39 stops. Check valve 52C could also be another type of check valve, such as a self-closing model, where its satisfactory operation is not dependent on its physical orientation. Siphon breaker 10A prevents the inadvertent siphonage of the contents of vacuum tank 51 at pipe elbow 26A through check valve 52C and light phase pump 39 via partially treated light phase conduit 20 and light phase discharge conduit 18 if, for example, light phase pump 39 were running at the time of a total power failure to Mixed Immiscible Liquids Vacuum, Separation, and Disposal System 50 and vacuum tank 51 was not under vacuum and was open to the atmosphere.

Light phase pump 39 discharges light phase liquids through partially treated light phase conduit 20 past pressure gauge 29C and siphon breaker 10A to the light phase terminal facility. In the preferred embodiment, light phase pump 39 is a positive displacement, lowshear, pump. In this embodiment, pressure relief valve 57A limits light phase pump 39 discharge pressure, which protects light phase pump 39 and all associated piping, tubing, and other connected devices. If the pressure at the discharge of light phase pump 39 exceeds the control setting of pressure relief valve 57A, the valve in pressure relief valve 57A opens, allowing liquid to return to the inlet of light phase pump 39. Pressure gauge 29C provides a visual measurement of the pressure in the discharge piping of light phase pump 39.

Referring momentarily to FIG. 2, in the preferred embodiment, and where the heavy phase liquid is water or seawater and the light phase is waste lubricating oil, fuel oil, or vegetable oil, light phase intermediate separation stage 47B and light phase intermediate separation stage heavy phase return conduit 22 are not provided, instead, the light phase flows directly through partially treated light phase conduit 20 and light phase discharge conduit 18 into its respective terminal facility.

Referring again to FIG. 3, in the preferred embodiment, and where the heavy phase liquid is water or seawater and the light phase is waste lubricating oil, fuel oil, or vegetable oil, the final disposal for light phase flow in light phase discharge conduit 18 past siphon breaker 10A is light phase receptacle(s) 41. Light phase receptacle(s) 41 can be one or many containers, receptacles, tanks, or barrels. As light phase receptacle(s) 41 fills, the liquid level rises, displacing air inside through air vent conduit 14A and out air vent conduit cap 12 into the atmosphere. When the free surface liquid level reaches, or exceeds liquid surface control level 31D, liquid surface level sensor 43C will, through logic panel 34, energize remote and/or local audible and/or visual alarms, while simultaneously electrically disabling heavy phase pump 38, light phase pump 39, and vacuum pump 40, and all their respective control circuits, thereby preventing the overfilling of light phase receptacle(s) 41 by Mixed Immiscible Liquids Vacuum, Separation, and Disposal System 50. Alarms located at light phase receptacle(s) 41 can serve to alert anyone in the vicinity that light phase receptacle(s) 41 are nearly full, which should also serve to interrupt anyone manually dumping liquids into light phase receptacle(s) 41.

Drain valve 53B provides for drainage of vacuum tank 51. Drain valve 53C provides for drainage of grit, sediment, particulate, and floating debris removal/collection chamber 11.

In the presently preferred embodiment, the following parts, materials, and components are used:

27 Filter, coalescing—FACET EB12-1, 5 micron rating
33 Media, oleophilic—JAEGAR PRODUCTS 1 inch diameter TRI-PAC
38 Pump, heavy phase—MOYNO 33359
39 Pump, light phase—MOYNO 33359
40 Pump, vacuum—GAST 1023-101Q-G608X
43 Sensor, liquid surface level (a–c)—THOMAS PRODUCTS Part number 3506 0.55 SG float switch
44 Sensor, phase interface—THOMAS PRODUCTS Part number 3506 0.96 SG float switch
48 Switch, differential pressure—BARKSDALE EPD1H-BB40
49 Switch, vacuum—BARKSDALE E1H-R-VAC-P6
51 Tank, vacuum—24 inch diam SDR 41 PVC, 5' high, with welded, reinforced/braced 1" thick PVC top and bottom
52A Valve, check—SMC BRS 470-6F6M-B
52B Valve check, low cracking pressure—SMC BRS 470-6F6M-B
52C/D Valve check—GSR 1 inch true union PVC ball check
52E Valve check—GSR ¾ inch true union PVC ball check
53A Valve drain—GSR ½ inch true union ball
53B/C Valve drain—GSR 1 inch true union ball
55 Valve, manually actuated and controlled valve—GSR ¾ inch true union PVC ball
57 Valve, relief, pressure (a & b)—CASH ACME MC75
58 Valve, relief, vacuum—GAST AA840A Conclusion, Ramifications, and Scope of Invention.

Thus the reader will see that the invention significantly improves the previously patented Dockside System for the Collection and Disposal of Bilge Water and Waste Oil (U.S. Pat. No. 4,623,452 issued to Petersen 1986 Nov. 18), while dramatically expanding the scope of its applicability to the collection, separation, and discharge of any two mixed immiscible liquids.

While the above description contains many specificities, they should not be construed as limitations on the scope of the invention, but rather as an exemplification of one preferred embodiment thereof. Besides those already mentioned, many other variations are possible. For example, referring to FIG. 2, heavy phase intermediate separation stage 47A and heavy phase intermediate separation stage light phase return conduit 21 could be eliminated if the heavy phase separation occurring in vacuum tank 51 satisfied the respective terminal facility discharge requirements. Thus, Mixed Immiscible Liquids Vacuum, Separation, and Disposal System 50 could discharge the separated heavy phase from vacuum tank 51 directly through partially treated heavy phase conduit 19 and heavy phase discharge conduit 17 to, say, reuse elsewhere. Also, referring to FIG. 3, liquid surface level sensors 43A and 43B, and phase interface sensor 44, could equally perform their stated functions if each was mounted separately through the side wall of vacuum tank 51 instead of together on the same guide rod.

Accordingly, the scope of the invention should be determined not by the embodiment(s) illustrated, but by the appended claims and their legal equivalents.

The embodiments of the invention in which an exclusive property or privilege is claimed are defined as follows:

1. A system to vacuum collect and vacuum convey mixed immiscible liquids from the source of, or the sources of, said mixed immiscible liquids into a separation facility, said mixed immiscible liquids being composed of a heavy phase and a light phase, said heavy phase having a greater specific gravity than the specific gravity of said light phase, said separation facility being under continuous vacuum, to separate said mixed immiscible liquids into said heavy phase and said light phase in said separation facility, and once said heavy phase is separated from said light phase in said separation facility, to ultimately discharge said heavy phase to a heavy phase terminal facility, and to ultimately discharge said light phase to a light phase terminal facility, respectively, said light phase terminal facility and said heavy phase terminal facility being under atmospheric pressure, comprising (a) a mixed immiscible liquids influent stream, said mixed immiscible liquids influent stream being said mixed immiscible liquids that flow into said separation facility, and (b) a vacuum tank, said vacuum tank having a top and a bottom, and an upper portion and a lower portion, said upper portion being above said lower portion, and (c) a vacuum tank air evacuation outlet, said vacuum tank air evacuation outlet being located near said top of said vacuum tank, and (d) a vacuum generating means, said vacuum generating means being coupled to said vacuum tank air evacuation outlet and causing and maintaining a continuous vacuum intensity in said vacuum tank, and (e) a vacuum tank mixed immiscible liquids inlet, said vacuum tank mixed immiscible liquids inlet being located near said top of said vacuum tank, and (f) a mixed immiscible liquids collection conduit or a mixed immiscible liquids collection conduit network, said mixed immiscible liquids collection conduit or said mixed immiscible liquids collection conduit network being coupled to said vacuum tank at said vacuum tank mixed immiscible liquids inlet and extending to said source of, or said sources of, said mixed immiscible liquids, and (g) a free surface liquid level in said vacuum tank at any time said vacuum tank contains said mixed immiscible liquids, and (h) a vacuum tank upper free surface liquid level sensing means, said vacuum tank upper free surface liquid level sensing means being located below said vacuum tank air evacuation outlet and below said vacuum tank mixed immiscible liquids inlet, and (i) a vacuum tank lower free surface liquid level sensing means, said vacuum tank lower free surface liquid level sensing means being located below said vacuum tank upper free surface liquid level sensing means, and (j) a vacuum tank light phase outlet, said vacuum tank light phase outlet being located below said vacuum tank lower free surface liquid level sensing means, and (k) a light phase flow control means, said light phase flow control means being coupled to said vacuum tank light phase outlet and delivering said light phase to said light phase terminal facility, and (l) a light phase/heavy phase interface, said light phase/heavy phase interface forming a horizontal transition line between said light phase and said heavy phase inside said vacuum tank at any time said vacuum tank contains mixed immiscible liquids, and (m) a vacuum tank light phase/heavy phase interface sensing means, said vacuum tank light phase/heavy phase interface sensing means being located in said upper portion of said vacuum tank and below said vacuum tank light phase outlet, and (n) a vacuum tank heavy phase outlet, said vacuum tank heavy phase outlet being located near said bottom of said vacuum tank and below said vacuum tank light phase/heavy phase interface sensing means, and (o) a heavy phase flow control means, said heavy phase flow control means being coupled to said vacuum tank heavy phase outlet and delivering said heavy phase to said heavy phase terminal facility, (p) said vacuum tank light phase/heavy phase interface sensing means being used to select and enable either said heavy phase flow control means or said light phase flow control means to operate depending on the elevation of said light phase/heavy phase interface inside said vacuum tank relative to the location of said vacuum tank light phase/heavy phase interface sensing means, said heavy phase flow control means being enabled at any time said light phase/heavy phase interface in said vacuum tank is above said vacuum tank light phase/heavy phase interface sensing means, said light phase flow control means being enabled at any time said light phase/heavy phase interface in said vacuum tank is at or below said vacuum tank light phase/heavy phase interface sensing means, (q) said vacuum tank upper free surface liquid level sensing means initiating, in conjunction with said vacuum tank light phase/heavy phase interface sensing means, the operation of either of said heavy phase flow control means or said light phase flow control means as determined by said vacuum tank light phase/heavy phase interface sensing means at any time said free surface liquid level in said vacuum tank is at or above the elevation of said vacuum tank upper free surface liquid level sensing means, (r) said vacuum tank lower free surface liquid level sensing means being used to prevent the operation of either said heavy phase flow control means or said light phase flow control means at any time said free surface liquid level in said vacuum tank is at or below the elevation of said vacuum tank lower free surface liquid level sensing means, (s) the vertical distance between said vacuum tank heavy phase outlet and said vacuum tank light phase/heavy phase interface sensing means being further prescribed as that which represents a mixed immiscible liquids detention time inside said vacuum tank that enables separation of said light phase from said heavy phase through differences in the specific gravities of said light phase and said heavy phase and through vacuum induced dissolved air flotation, such that the volumetric degree of separation of said light phase from said heavy phase is at least 99% before said heavy phase exits said vacuum tank at said vacuum tank heavy phase outlet at any time said heavy phase flow control means operates coincident with the flow of said mixed immiscible liquids into said vacuum tank, and (t) a vacuum generating means/vacuum tank coupling conduit, said vacuum generating means/vacuum tank coupling conduit coupling said vacuum generating means to said vacuum tank at said vacuum tank air evacuation outlet, and (u) a light phase flow control means/vacuum tank coupling conduit, said light phase flow control means/vacuum tank coupling conduit coupling said light phase flow control means to said vacuum tank at said vacuum tank light phase outlet, and (v) a heavy phase flow control means/vacuum tank coupling conduit, said heavy phase flow control means/vacuum tank coupling conduit coupling said heavy phase flow control means to said vacuum tank at said vacuum tank heavy phase outlet.

2. The system of claim 1, further including a grit, sediment, particulate, and floating debris removal means, said grit, sediment, particulate and floating debris removal means being selected from the group consisting of filters, strainers, screens, settling chambers, and combinations thereof, said grit, sediment, particulate and floating debris removal means being established in said mixed immiscible liquids influent stream.

3. The system of claim 1, further including a combined entrained air purging and back siphonage prevention means, said combined entrained air purging and back siphonage prevention means being coupled to said vacuum tank mixed immiscible liquids inlet inside said vacuum tank and incorporating an air gap between any said free surface liquid level inside said vacuum tank and said vacuum tank mixed immiscible liquids inlet inside said vacuum tank.

4. The system of claim 1, further including a vacuum tank mixed immiscible liquids influent stream subinterface delivery means, said vacuum tank mixed immiscible liquids influent stream subinterface delivery means being inside said vacuum tank and comprising a horizontal overflow weir and a separated phase agitation prevention plate, said horizontal overflow weir being located near but below said vacuum tank mixed immiscible liquids inlet and at approximately the same elevation as said vacuum tank upper free surface liquid level sensing means, said separated phase agitation prevention plate having a horizontal top edge, a horizontal bottom edge, and sides, said separated phase agitation prevention plate being a solid plane surface oriented nearly vertically, said separated phase agitation prevention plate being further prescribed as being in parallel with, and relatively close to, the alignment of said horizontal overflow weir, said horizontal top edge of said separated phase agitation prevention plate being near said top of said vacuum tank and providing a relatively small air gap between said horizontal top edge of said separated phase agitation prevention plate and said top of said vacuum tank, and said sides of said separated phase agitation prevention plate being connected to said vacuum tank and sealed continuously along said sides of said separated phase agitation prevention plate to be liquid tight, said horizontal bottom edge of said separated phase agitation prevention plate being located slightly lower than the elevation of said vacuum tank light phase/heavy phase interface sensing means.

5. The system of claim 1, wherein said vacuum tank upper free surface liquid level sensing means also prevents the operation of said vacuum generating means at any time said free surface liquid level in said vacuum tank is at or above said vacuum tank upper free surface liquid level sensing means.

6. The system of claim 1, wherein said vacuum tank light phase outlet further includes a heavy phase exclusion means, said heavy phase exclusion means being inside said vacuum tank and comprising a vertically oriented conduit segment and a horizontally oriented vertical flow influence line deflector plate, said vertically oriented conduit segment extending vertically upwards from the actual draw-off point defining said vacuum tank light phase outlet, the lower end opening of said vertically oriented conduit segment being heady horizontal, and said horizontally oriented vertical flow influence line deflector plate being located slightly below said lower opening of said vertically oriented conduit segment but slightly above said vacuum tank light phase/ heavy phase interface sensing means, said horizontally oriented vertical flow influence line deflector plate being of a surface area and configuration to exclude the introduction of any said heavy phase into said vacuum tank light phase outlet at any time said light phase flow control means operates.

7. The system of claim 1, further including a quantity of high void space light phase separation enhancement media means, said quantity of high void space light phase separation enhancement media means being fixed inside said vacuum tank in the space defined as slightly below said vacuum tank light phase/heavy phase interface sensing means and slightly above said vacuum tank heavy phase outlet, said quantity of high void space light phase separation enhancement media means having void space to permit laminar vertical flow of said mixed immiscible liquids through said quantity of high void space light phase separation enhancement media means when said heavy phase flow control means operates, said quantity of high void space light phase separation enhancement media means having surface and presenting more than 40 square feet of the area of said surface per in-situ cubic foot of said quantity of high void space light phase separation enhancement media means, said quantity of high void space light phase separation enhancement media means being further prescribed as being of a material that preferentially attracts said light phase to said quantity of high void space light phase separation enhancement media means, said quantity of high void space light phase separation enhancement media means attracting and temporarily holding said light phase at said surface of said quantity of high void space light phase separation enhancement media means until said light phase attached to said surface of said quantity of high void space light phase separation enhancement media means accumulates and grows to a size that said light phase detaches from said surface of said quantity of high void space light phase separation enhancement media means and ascends through said heavy phase by virtue of differences in specific gravity between said light phase and said heavy phase.

8. The system of claim 1, further including a full light phase terminal storage facility triggered system operation interrupt and alarm means, said full light phase terminal storage facility triggered system operation interrupt and alarm means comprising a light phase terminal storage facility high liquid level sensing means, said light phase terminal storage facility high liquid level sensing means being installed in said light phase terminal facility at any time said light phase terminal facility is a light phase storage container means, said light phase storage container means being selected from the group consisting of tanks, drums, barrels, vaults, containers, and combinations thereof, said light phase storage container means having a light phase storage container means liquid level at any time said light phase storage container means contains said light phase, said light phase terminal storage facility high liquid level sensing means simultaneously preventing the operation of said light phase flow control means at any time said light phase storage container means liquid level is at or above said light phase terminal storage facility high liquid level sensing means, and energizing means being selected from the alarm system means being selected from the group consisting of local visual alarms, local audible alarms, combination local visual and audible alarms, remote visual alarms, remote audible alarms, combination remote visual and audible alarms, and combinations thereof.

9. The system of claim 1, further including a full heavy phase terminal storage facility triggered system operation interrupt and alarm means, said full heavy phase terminal storage facility triggered system operation interrupt and alarm means comprising a heavy phase terminal storage facility high liquid level sensing means, said heavy phase terminal storage facility high liquid level sensing means being installed in said heavy phase terminal facility at any time said heavy phase terminal facility is a heavy phase storage container means, said heavy phase storage container means being selected from the group consisting of tanks, drums, barrels, vaults, containers, and combinations thereof, said heavy phase storage container means having a heavy phase storage container means liquid level at any time said heavy phase storage container means contains said heavy phase, said heavy phase terminal storage facility high liquid level sensing means simultaneously preventing the operation of said heavy phase flow control means at any time said heavy phase storage container means liquid level is at or is above said heavy phase terminal storage facility high liquid level sensing means, and energizing an alarm system means, said alarm system means being selected from the group consisting of local visual alarms, local audible alarms, combination local visual and audible alarms, remote visual alarms, remote audible alarms, combination remote visual and audible alarms, and combinations thereof.

10. The system of claim 1, further including a flow reversal prevention means, said flow reversal prevention means being selected from the group consisting of check valves, solenoid valves, pneumatically operated shut off valves, and combinations thereof, said flow reversal prevention means being installed in said vacuum generating means/ vacuum tank coupling conduit, in said light phase flow control means/vacuum tank coupling conduit, and in said heavy phase flow control means, vacuum tank coupling conduit.

11. The system of claim 1, further including a heavy phase supplemental separation means, said heavy phase supplemental separation means being selected from the group consisting of coalescing filter separation means, ultrafiltration separation means, reverse osmosis separation means, centrifuge separation means, distillation separation means, microfiltration entrapment means, selective phase absorption means, selective phase adsorption means, and combinations thereof, said heavy phase supplemental separation means being established between said heavy phase flow control means and said heavy phase terminal facility, said heavy phase supplemental separation means being equipped with a heavy phase supplemental separation means pretreated heavy phase inlet, said heavy phase supplemental separation means pretreated heavy phase inlet being coupled to said heavy phase flow control means by a heavy phase supplemental separation means pretreated heavy phase conduit, said heavy phase supplemental separation means being further equipped with a heavy phase supplemental separation means treated heavy phase outlet, said heavy phase supplemental separation means treated heavy phase outlet being coupled to said heavy phase terminal facility by a heavy phase supplemental separation means treated heavy phase conduit, said heavy phase supplemental separation means being further equipped with, provided that said heavy phase supplemental separation means is not said microfiltration entrapment means, or said selective phase absorption means, or said selective phase adsorption means, a heavy phase supplemental separation means light phase outlet, said heavy phase supplemental separation means light phase outlet being coupled to said vacuum tank at or near said vacuum tank mixed immiscible liquids inlet by a heavy phase supplemental separation means light phase return conduit, said heavy phase supplemental separation means treated heavy phase conduit being equipped with a flow reversal prevention means, provided said heavy phase supplemental separation means light phase return conduit exists, said flow reversal prevention means being selected from the group consisting of check valves, solenoid valves, pneumatically operated shut off valves, and combinations thereof, whereby said heavy phase supplemental separation means increases the degree of separation of said light phase from said heavy phase after said heavy phase exits said vacuum tank at said vacuum tank heavy phase outlet.

12. The system of claim 1, further including a light phase supplemental separation means, said light phase supplemental separation means being selected from the group consisting of coalescing filter separation means, ultrafiltration separation means, reverse osmosis separation means, centrifuge separation means, distillation separation means, microfiltration entrapment means, selective phase absorption means, selective phase adsorption means, and combinations thereof, said light phase supplemental separation means being established between said light phase flow control means and said light phase terminal facility, said light phase supplemental separation means being equipped with a light phase supplemental separation means pretreated light phase inlet, said light phase supplemental separation means pretreated light phase inlet being coupled to said light phase flow control means by a light phase supplemental separation means pretreated light phase conduit, said light phase supplemental separation means being further equipped with a light phase supplemental separation means treated light phase outlet, said light phase supplemental separation means treated light phase outlet being coupled to said light phase terminal facility by a light phase supplemental separation means treated light phase conduit, said light phase supplemental separation means being further equipped with, provided that said supplemental heavy phase treatment means is not said microfiltration entrapment means, said selective phase absorption means, or said selective phase adsorption means, a light phase supplemental separation means heavy phase outlet, said light phase supplemental separation means heavy phase outlet being coupled to said vacuum tank at or near said vacuum tank mixed immiscible liquids inlet by a light phase supplemental separation means heavy phase return conduit, said light phase supplemental separation means treated light phase conduit being equipped with a flow reversal prevention means, provided said light phase supplemental separation means heavy phase return conduit exists, said flow reversal prevention means being selected from the group consisting of check valves, solenoid valves, pneumatically operated shut off valves, and combinations thereof, whereby said light phase supplemental separation means increases the degree of separation of said heavy phase from said light phase after said light phase exits said vacuum tank at said vacuum tank light phase outlet.

13. The system of claim 1, further including a mixed immiscible liquids collection conduit flow control valve means, said mixed immiscible liquids collection conduit flow control valve means being selected from the group consisting of manually operated valves, mechanically operated valves, electromechanically operated valves, pneumatically operated valves, and combinations thereof, said mixed immiscible liquids collection conduit flow control valve means being installed in said mixed immiscible liquids collection conduit, or, if said mixed immiscible liquids collection conduit network exists, in each branch conduit of said mixed immiscible liquids collection conduit network.

14. The system of claim 1, further including a vacuum sensing means, said vacuum sensing means being coupled to said vacuum tank and said vacuum generating means, and being used to maintain a constant vacuum intensity inside said vacuum tank as created by said vacuum generating means.

15. The system of claim 1, further including a vacuum tank positive pressure prevention means, said vacuum tank positive pressure prevention means being selected from the group consisting of pressure relief valves, check valves, and combinations thereof, and being coupled to said vacuum tank and to a vent conduit in said light phase terminal facility or in said heavy phase terminal facility, if said light phase terminal facility or if said heavy phase terminal facility exists, and if said vent conduit in said light phase terminal facility or in said heavy phase terminal facility exists, and if said light phase terminal facility or if said heavy phase terminal facility is a storage container means, said storage container means being selected from the group consisting of tanks, drums, barrels, vaults, containers, and combinations thereof.

16. The system of claim 1, wherein the exhaust air exiting from said vacuum generating means is coupled to a vent conduit in said light phase terminal facility or in said heavy phase terminal facility, if said light phase terminal facility or said heavy phase terminal facility exists, and if said vent conduit in said light phase terminal facility or in said heavy phase terminal facility exists, and if said light phase terminal facility or if said heavy phase terminal facility is a storage container means, said storage container means being selected from the group consisting of tanks, drums, barrels, vaults, containers, and combinations thereof.

17. The system of claim 1, further including a vacuum tank maximum vacuum intensity regulating means, said vacuum tank maximum vacuum intensity regulating means being selected from the group consisting of vacuum relief valves and combinations thereof, and being coupled to said vacuum tank above said vacuum tank upper free surface liquid level sensing means.

18. A method to collect, separate, and discharge once separated, mixed immiscible liquids, said mixed immiscible liquids containing a heavy phase and a light phase, the specific gravity of said heavy phase being greater than the specific gravity of said light phase, said mixed immiscible liquids being further prescribed as possibly containing any of entrained air, grit, sediments, particulates, or floating debris, employing:

(a) continuous or intermittent vacuum collection and vacuum conveyance of said mixed immiscible liquids under manual or automatic flow control from the source of, or the sources of, said mixed immiscible liquids, into a separation facility, said separation facility being under continuous automatically regulated vacuum intensity, using, before the entry of said mixed immiscible liquids into said separation facility, apparatus capable of removing any of said entrained air, grit, sediments, particulates, or floating debris, and (b) continuous and automatic separation of said mixed immiscible liquids into said heavy phase and said light phase in said separation facility, said separation of said mixed immiscible liquids in said separation facility resulting from the simultaneous dynamics of quiescent differential specific gravity separation and dissolved air flotation separation, said dissolved air flotation separation being induced by the constant vacuum in said separation facility, the degree of said separation of said mixed immiscible liquids in said separation facility being partial or complete, and (c) discharge of said heavy phase from said separation facility directly to a heavy phase terminal facility, or discharge of said heavy phase from said separation facility first to a heavy phase supplemental treatment facility or to a series of heavy phase supplemental treatment facilities, and then on to said heavy phase terminal facility, said heavy phase terminal facility providing storage or disposal of said heavy phase, said heavy phase supplemental treatment facility or said heavy phase supplemental treatment facilities providing further separation or additional treatment of said heavy phase, and (d) discharge of said light phase from said separation facility directly to a light phase terminal facility, or discharge of said light phase from said separation facility first to a light phase supplemental treatment facility or to a series of light phase supplemental treatment facilities, and then on to said light phase terminal facility, said light phase terminal facility providing storage or disposal of said light phase, said light phase supplemental treatment facility or said light phase supplemental treatment facilities providing further separation or additional treatment of said light phase.

* * * * *